US009876918B2

(12) United States Patent
Tokiwa et al.

(10) Patent No.: US 9,876,918 B2
(45) Date of Patent: Jan. 23, 2018

(54) INFORMATION PROCESSING SYSTEM FOR GENERATING JOB EXECUTION SCREEN, ELECTRONIC APPARATUS, AND PROGRAM

(71) Applicants: Masafumi Tokiwa, Kanagawa (JP); Kazunori Takatsu, Kanagawa (JP)

(72) Inventors: Masafumi Tokiwa, Kanagawa (JP); Kazunori Takatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/956,552

(22) Filed: Dec. 2, 2015

(65) Prior Publication Data

US 2016/0165076 A1 Jun. 9, 2016

(30) Foreign Application Priority Data

Dec. 9, 2014 (JP) .................................. 2014-249259
Nov. 27, 2015 (JP) .................................. 2015-231945

(51) Int. Cl.
G06F 3/12 (2006.01)
H04N 1/00 (2006.01)
G06K 1/00 (2006.01)

(52) U.S. Cl.
CPC ..... *H04N 1/00244* (2013.01); *H04N 1/00204* (2013.01); *H04N 1/00344* (2013.01); *H04N 2201/0094* (2013.01)

(58) Field of Classification Search
CPC ........... H04N 1/00244; H04N 1/00344; H04N 1/00204; H04N 1/00408; H04N 1/32411; H04N 1/2179; H04N 2201/0094; H04N 2201/3205; H04N 2201/3278; G06F 3/1205; G06F 3/1293; G06F 3/1238; G06F 3/1287; G06F 3/1222

USPC ............................................... 358/1.1–1.118
See application file for complete search history.

(56) References Cited

U.S. PATENT DOCUMENTS 9,124,733 B2    9/2015  Ando
2009/0091782 A1* 4/2009  Okamoto .............. G06F 21/554
                                                    358/1.15
2010/0302579 A1 12/2010  Nuggehalli et al.
(Continued)

FOREIGN PATENT DOCUMENTS

JP          2014-032659          2/2014

OTHER PUBLICATIONS

Extended European Search Report dated Apr. 28, 2016.

*Primary Examiner* — Gabriel Garcia
(74) *Attorney, Agent, or Firm* — IPUSA, PLLC

(57) ABSTRACT

An information processing system including an electronic apparatus and at least one information processing apparatus which are connected through a network includes an acquisition destination information administration unit configured to administer acquisition destination information of setup information for an execution of a job in the electronic apparatus, a setup information acquisition unit configured to acquire the setup information from an acquisition destination specified by the acquisition destination information acquired from the acquisition destination information administration unit, and a setup information reflection unit configured to control a content of the job executed by the electronic apparatus based on a content of the setup information.

9 Claims, 19 Drawing Sheets

(56) References Cited

U.S. PATENT DOCUMENTS

| | | | |
|---|---|---|---|
| 2013/0033727 A1* | 2/2013 | Suzuki | G06F 3/1205 358/1.15 |
| 2013/0063774 A1 | 3/2013 | Nuggehalli et al. | |
| 2013/0194630 A1* | 8/2013 | Kishimoto | G06F 3/1296 358/1.15 |
| 2015/0178030 A1* | 6/2015 | Kasahara | G06F 3/1205 358/1.15 |

* cited by examiner

FIG.9

| serial | EXTERNAL SERVICE URL |
|---|---|
| 1111 | http://OOO.com/A |
| 2222 | http://OOO.com/B |
| ⋮ | |

FIG.10

| | A | B | C | D | E | F | G | H | I |
|---|---|---|---|---|---|---|---|---|---|
| 1 | LABEL | FORMAT | COLOR | RESOLUTION | OCR | STORAGE DESTINATION | | | |
| 2 | DRAWING | PDF | Color | 300dpi | No | https://OOO.com/folderid/qwertyuiop | | | |
| 3 | ORDER SHEET | PDF | Gray | 300dpi | Yes | https://OOO.com/folderid/asdfghjkl | | | |
| 4 | CONTRACT DOCUMENT | PDF | Gray | 200dpi | No | https://OOO.com/folderid/zxcvbnm | | | |
| 5 | | | | | | | | | |
| 6 | | | | | | | | | |

FIG.18

| | A | B | C | D |
|---|---|---|---|---|
| | CLIENT FAX LIST ☆ 🗁 | | | |
| | FILE EDIT DISPLAY INSERT DISPLAY TYPE DATA TOOL ADDON HELP | | | |
| fx | | | | |
| 1 | LABEL | PRONUNCIATION | FAX NO. | |
| 2 | 山田電子 | やまだでんし | 03-XXXX-XXXX | |
| 3 | 鈴木エレクトロニクス | すずきえれ | 045-XXX-XXXX | |
| 4 | 大阪商事 | おおさかしょうじ | 06-XXXX-XXXX | |
| 5 | 洛北電機 | らくほくでんき | 075-XXX-XXXX | |
| 6 | | | | |

FIG.19

FAX

| NAME | DESTINATION |
|---|---|
| 山田電子 | 03-XXXX-YYYY |
| 鈴木エレクトロニクス | 045-XXX-XXXX |
| 大阪商事 | 06-XXXX-XXXX |
| 洛北電機 | 075-XXX-XXXX |
| | |

START

INFORMATION PROCESSING SYSTEM FOR GENERATING JOB EXECUTION SCREEN, ELECTRONIC APPARATUS, AND PROGRAM

BACKGROUND OF THE INVENTION

1. Field of the Invention

The present invention relates to an information processing system, an electronic apparatus, and a program.

2. Description of the Related Art

In recent years, in an image forming apparatus performing a job, a use of a service such as an online storage service provided through a network such as the Internet is becoming popular. An image forming apparatus performing a job actually provides a service such as a cloud scan service and a cloud print service by using the service such as the online storage service.

There is an example of an information processing system which causes an administrator to set a profile and performs an association between, for example, an apparatus such as an image forming apparatus and the service provided through the network using the set profile for achieving the association (see, for example, Patent Document 1).

Patent Document 1: Japanese Laid-Open Patent Publication No. 2014-32659

SUMMARY OF THE INVENTION

One aspect of the embodiments of the present invention may be to provide an information processing system including an electronic apparatus and at least one information processing apparatus which are connected through a network including an acquisition destination information administration unit configured to administer acquisition destination information of setup information for an execution of a job in the electronic apparatus, a setup information acquisition unit configured to acquire the setup information from an acquisition destination specified by the acquisition destination information acquired from the acquisition destination information administration unit, and a setup information reflection unit configured to control a content of the job executed by the electronic apparatus based on a content of the setup information.

BRIEF DESCRIPTION OF THE DRAWINGS

FIG. 9 illustrates an exemplary structure of an information table of use external service.

FIG. 10 illustrates an image of an exemplary spreadsheet in which job setup information is registered.

FIG. 18 illustrates an image of an exemplary spreadsheet in which job setup information is registered.

FIG. 19 illustrates an image of an exemplary job execution screen for facsimile (Fax).

DETAILED DESCRIPTION OF THE PREFERRED EMBODIMENTS

For example, in an electronic apparatus such as an image forming apparatus providing the service such as the cloud scan service and the cloud print service, it is necessary to set information for executing the job for providing the service. The information for executing the job for providing the service is frequently set using a UI different for each service. Therefore, there is a problem that a user who sets the information for executing the job for providing the service learns how to use the UI different for each service and previously sets the information to the electronic apparatus.

For example, in an example of the electronic apparatus such as the image forming apparatus, the information such as a destination is used by registering an address book provided inside the electronic apparatus or by associating with an address administration system within the company. However, information such as an external address or the like of a client company is required to be registered into the address book provided inside the electronic apparatus to perform a dual administration of the information such as the external address.

Further, in an example of the electronic apparatus such as the image forming apparatus, the information such as the address is required to be registered into an internal address book in a case where the electronic apparatus is replaced.

An object of the embodiment of the present invention is to provide an information processing system which can easily set information for executing a job.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

A description is given below, with reference to the FIG. 1 through FIG. 20 of embodiments of the present invention.

Where the same reference symbols are attached to the same parts, repeated description of the parts is omitted.

First Embodiment

<System Structure>

Figure 1:
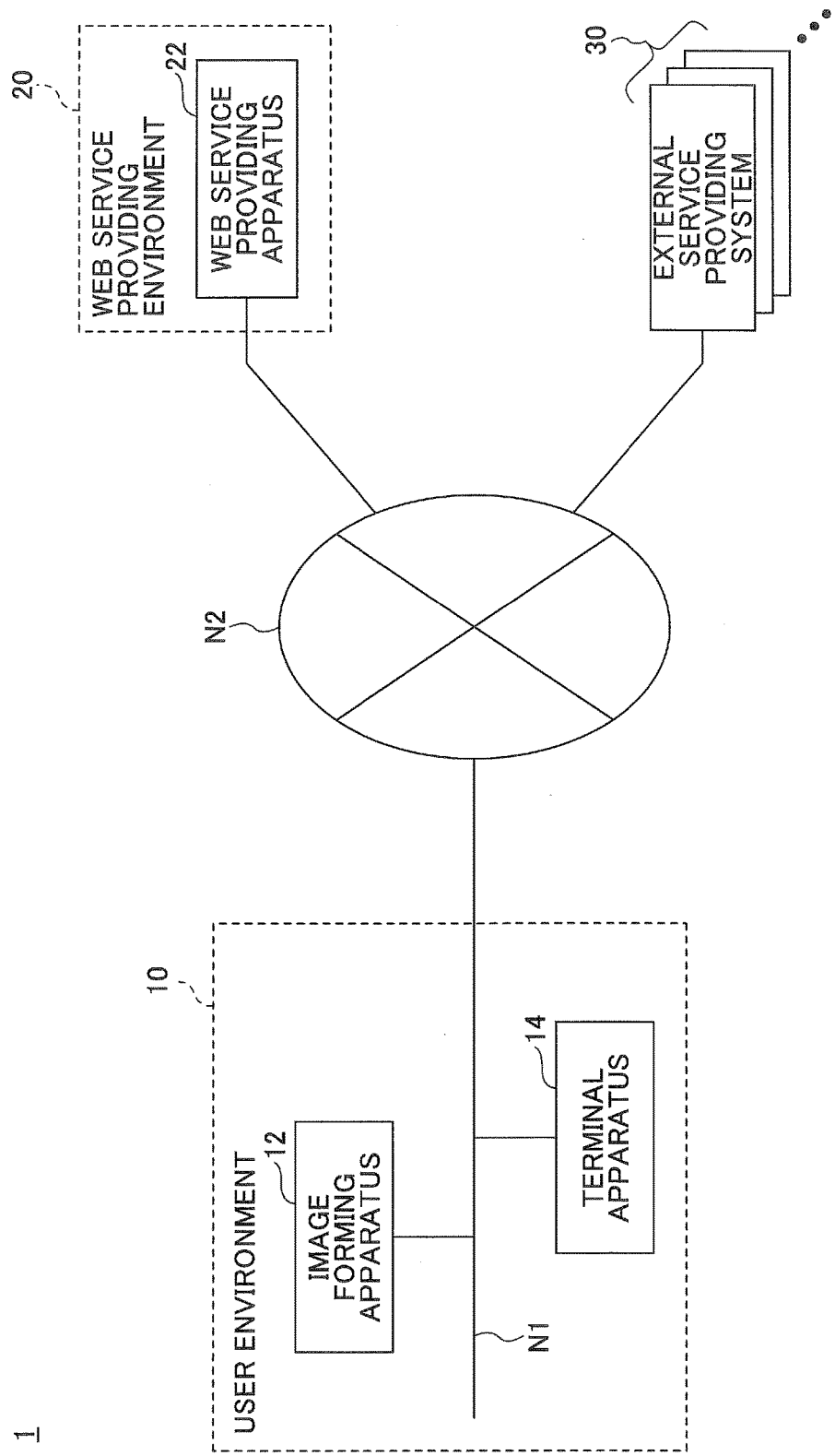
FIG. 1 illustrates an exemplary system structure of an information processing system of an embodiment.

FIG. 1 illustrates a structure of an exemplary information processing system of a first embodiment. The information processing system 1 includes a user environment 10, a web service providing environment 20, at least one external service providing system 30, and a network N2 such as the Internet connecting the user environment 10, the web service providing environment 20, and the at least one external service providing system 30.

The user environment 10 is a system of an organization of a user enterprise or the like of the image forming apparatus 12. In the user environment 10, at least one image forming apparatus 12 and at least one terminal apparatus 14 are connected through a network N1 such as a local area network (LAN). The image forming apparatus 12 is an example of an electronic apparatus. The electronic apparatus of the first embodiment includes the image forming apparatus such as a multifunction peripheral, a scanner, a printer, a facsimile, a projector, and an electronic blackboard and various electronic apparatuses executing a job in conformity with a job setup. For example, the image forming apparatus 12 performs an image forming process such as scan, print (output), and facsimile (FAX).

The terminal apparatus 14 is operated by an administrator or a user of the image forming apparatus 12 in the user environment 10. The terminal apparatus 14 is, for example, a personal computer (PC), a tablet type terminal, a smartphone, a mobile phone, a personal digital assistance (PDA) and so on.

The web service providing environment 20 is a system of an organization such as a service enterprise or the like which provides a web service such as a cloud scan service and a cloud print service through the network N2. The web service providing environment 20 includes a web service providing apparatus 22. Although the web service is described as an example, the first embodiment is applicable to a service provided by an application service provider (ASP) and a cloud service, which are provided through the network N2.

The web service providing apparatus 22 provides the web service such as the cloud scan service and the cloud print service to the image forming apparatus 12 through the network N2. For example, the cloud scan service is to store image data scanned by the image forming apparatus 12 of the user environment 10 in a predetermined storage destination (a storage area) such as an online storage provided by the external service providing system 30. Further, the cloud print service is to print print data stored in a predetermined storage destination such as an online storage service provided by the external service providing system 30 using the image forming apparatus 12 of the user environment 10.

Further, the external service providing system 30 provides, for example, a service such as the online storage service through the network N2. Within the first embodiment, the service such as the cloud service provided by the external service providing system 30 is called an "external service" in order to distinguish this service from the web service provided by the web service providing apparatus 22.

Referring to FIG. 1, the network N1 of the information processing system 1 may be a wired communication network or a wireless communication network. The information processing system 1 illustrated in FIG. 1 is an example of a system structure. For example, the web service providing apparatus 22 of the web service providing environment 20 may be formed by multiple computers, to which functions of the web service providing apparatus 22 are distributed.

<Hardware Structure>

<<Computer>>

Figure 2:
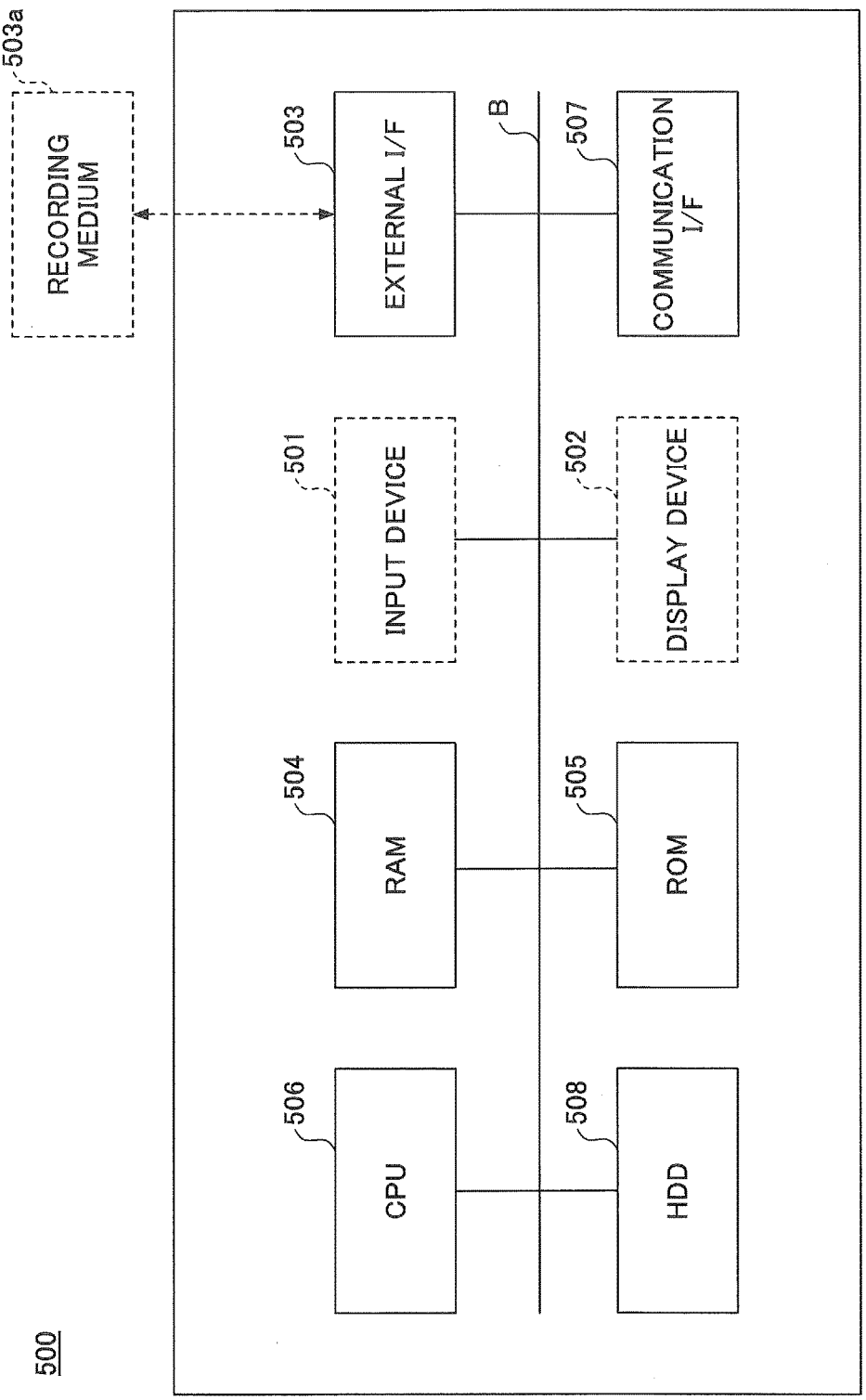
FIG. 2 illustrates an exemplary hardware structure of a computer of the embodiment.

The terminal apparatus 14, the web service providing apparatus 22, and the external service providing system 30 are substantialized by a computer having a hardware structure illustrated in, for example, FIG. 2. FIG. 2 illustrates the hardware structure of an exemplary computer of the first embodiment.

Referring to FIG. 2, the computer 500 includes an input device 501, a display device 502, an external I/F 503, a RAM 504, a ROM 505, a CPU 506, a communication I/F 507, a HDD 508, and so on, mutually connected by a bus B. It is acceptable to provide a structure such that the input device 501 and the display device 502 are connected when necessary.

The input device 501 includes a keyboard, a mouse, a touch panel, and the like, by which a user can input various operation signals. The display device 502 includes a display or the like to display a processing result obtained by the computer 500.

The communication I/F 507 is an interface provided to connect the computer 500 with various networks. Thus, the computer 500 can perform data communications through the communication I/F 507.

The HDD 508 is an exemplary non-volatile memory device that stores a program and data. The stored program and data are an operating system (OS), which is basic software controlling the entire computer 500, application software (hereinafter, simply referred to as an "application") providing various functions in the OS, and so on. The computer 500 may use a drive device using a flash memory (e.g., a solid state drive (SSD)) as a memory medium in place of the HDD 508.

The external I/F 503 is an interface with an external apparatus. The external apparatus includes a recording medium 503*a* or the like. With this, the computer 500 can read information from the recording medium 503*a* and/or write information to the recording medium 503*a* through the external I/F 503. The recording medium 503*a* is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the computer 500. The RAM 504 is an example of a volatile semiconductor memory (a memory device) temporarily storing the program and/or the data.

The CPU 506 reads the program and/or the data from the memory device such as the ROM 505, the HDD 508, or the like. The read program or the read data undergo a process to thereby substantialize a control or a function of the entire computer 500.

Figure 3:
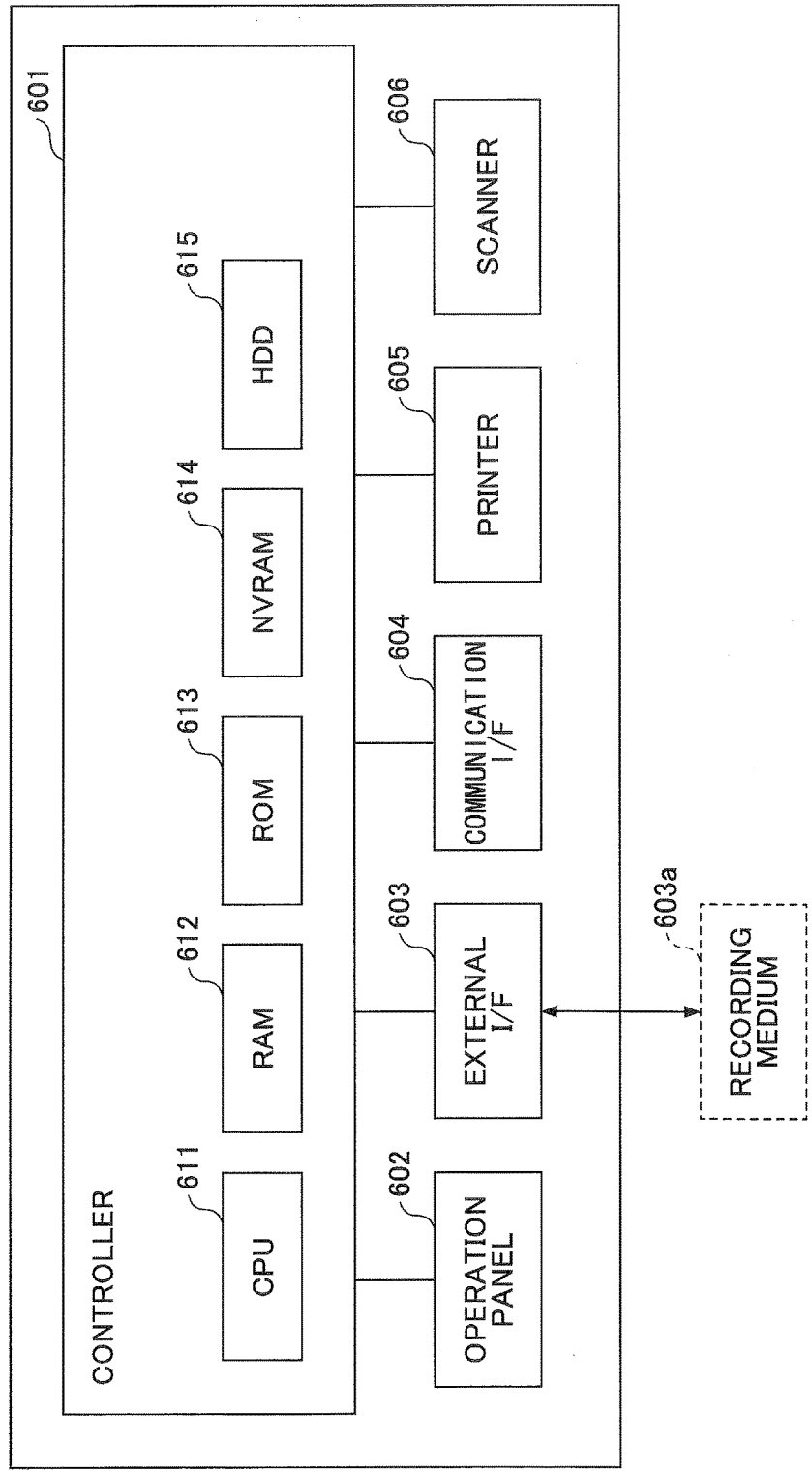
FIG. 3 illustrates a hardware structure of an exemplary image forming apparatus of the first embodiment.

The terminal apparatus 14, the web service providing apparatus 22, and the external service providing system 30 are substantialized by the hardware structure of the computer 500 illustrated in, for example, FIG. 3.

<<Image Forming Apparatus>>

The image forming apparatus 12 illustrated in FIG. 1 is substantialized by a computer having hardware structure illustrated in, for example, FIG. 3. FIG. 3 illustrates the hardware structure of an exemplary image forming apparatus of the first embodiment. The image forming apparatus 12 illustrated in FIG. 3 includes a controller 601, an operation panel 602, an external I/F 603, a communication I/F 604, a printer 605, a scanner 606, and so on.

The controller 601 includes a CPU 611, a RAM 612, a ROM 613, a NVRAM 614, a HDD 615, and so on. Various programs and data are stored in the ROM 613. The RAM 612 temporarily stores the program and the data. Setup information or the like is stored in the NVRAM 614. Various programs and data are stored in the HDD 615.

The CPU 611 reads the program, the data, setup information, or the like into the RAM 612 from the ROM 613, the NVRAM 614, the HDD 615, or the like, and performs the process. Thus, the CPU 611 substantializes an entire control or functions of the image forming apparatus 12.

The operation panel 602 includes an input unit for receiving an input from the user and a display unit for a display. The external I/F 603 is an interface with the external apparatus. The external apparatus includes a recording medium 603a or the like. With this, the terminal apparatus 14 can read information from the recording medium 603a and/or write information to the recording medium 603a through the external I/F 603. The recording medium 603a is an IC card, a flexible disk, a CD, a DVD, an SD memory card, a USB memory, or the like.

The communication I/F 604 is an interface provided to connect the image forming apparatus 12 with the network N1. Thus, the image forming apparatus 12 can perform data communications with another device and/or another apparatus through the communication I/F 604. The printer 605 is provided for printing print data on a print paper. The scanner 606 is a reading device for reading image data (electronic data) from an original manuscript.

<Software Structure>

Figure 4:
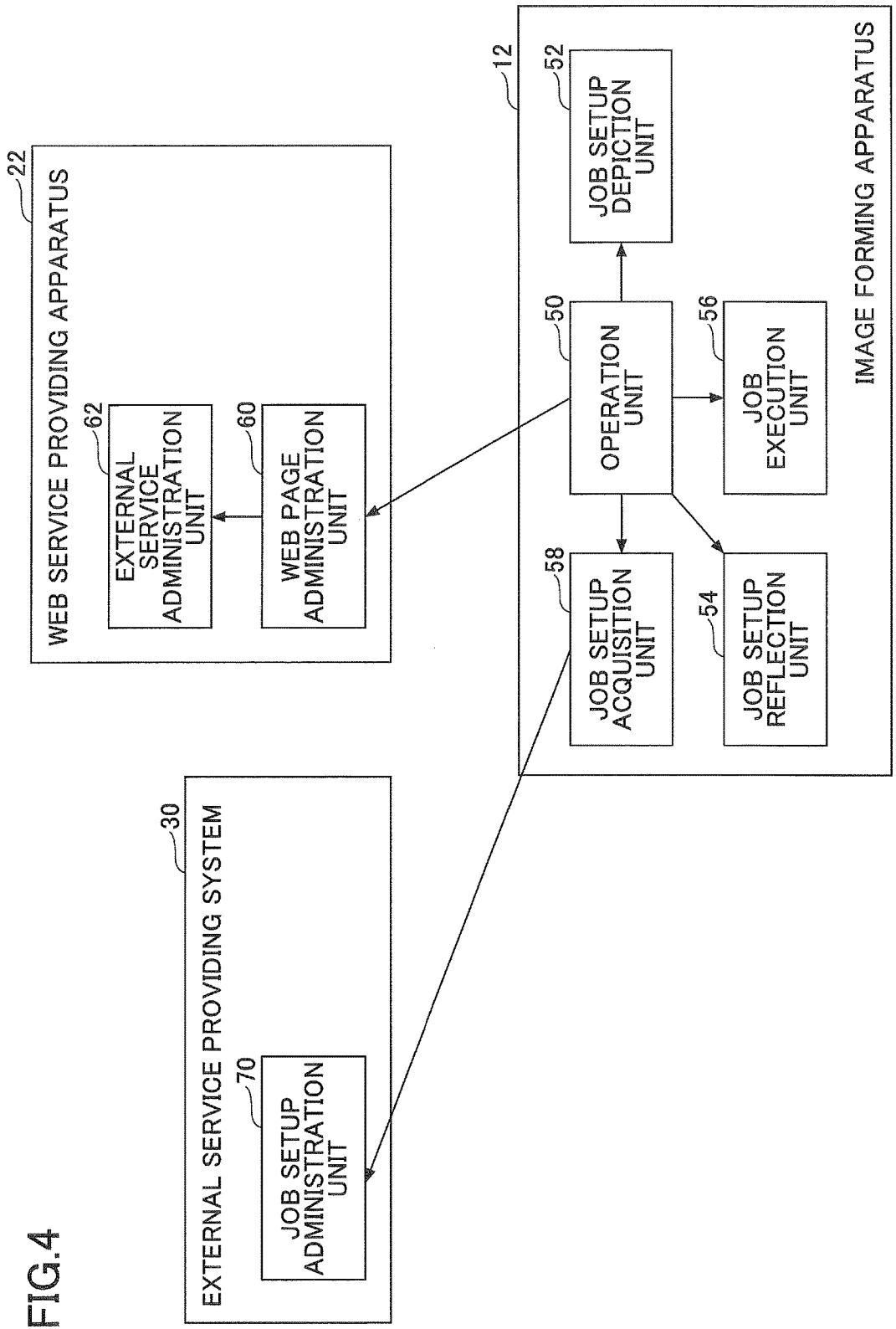
FIG. 4 is an exemplary processing block diagram of the information processing system of the embodiment.

The image forming apparatus 12, the web service providing apparatus 22, and an external service providing system 30 of the first embodiment are substantialized a processing block diagram illustrated in, for example, FIG. 4. FIG. 4 is a processing block diagram of an exemplary information processing system of the first embodiment.

The image forming apparatus 12 included in the information processing system 1 illustrated in FIG. 4 executes a program to substantialize an operation unit, a job setup depiction unit 52, a job setup reflection unit, a job execution unit 56, and a job setup acquisition unit 58.

Further, the web service providing apparatus 22 included in the information processing system 1 illustrated in FIG. 4 executes a program to substantialize a web page administration unit 60 and an external service administration unit 62. The external service providing system 30 included in the information processing system 1 illustrated in FIG. 4 substantializes a job setup administration unit 70.

The operation unit 50 of the image forming apparatus 12 receives various instructions by a user operation. The operation unit 50 acquires job execution screen data from the web service providing apparatus 22 and displays a job execution screen. The job setup depiction unit 52 performs a depiction for causing a user to select a job on the job execution screen. The job setup reflection unit 54 reflects the job setup in a parameter of a job execution. The job execution unit 56 executes the job based on the parameter of the job execution, in which the job setup is reflected. The job setup acquisition unit 58 acquires job setup information from the job setup administration unit 70 of the external service providing system 30.

The web page administration unit 60 of the web service providing apparatus 22 provides the job execution screen data to the image forming apparatus 12. The external service administration unit 62 administers use external service information described below. The external service administration unit 62 provides use external service information based on an acquisition request from the web page administration unit 60. The job setup administration unit 70 of the external service providing system 30 provides job setup information based on an acquisition request from the image forming apparatus 12.

The processing blocks may be implemented on a basis of a web application of a browser. In this case, the browser is installed in the image forming apparatus 12. The browser installed in the image forming apparatus 12 substantializes the processing blocks illustrated in FIG. 4 by executing JavaScript ("JavaScript" is a registered trademark) embedded in job execution screen data (HTML data) acquired from the web service providing apparatus 22. For example, the processing blocks other than the operation unit 50 among the processing blocks in the image forming apparatus 12 illustrated in FIG. 12 functions by implementing JavaScript ("JavaScript" is a registered trademark) embedded in job execution screen data.

<Detailed Process>

Hereinafter, a detailed process of the information processing system 1 of the first embodiment is described.

<<Introduction of Web Service>>

Figure 5:
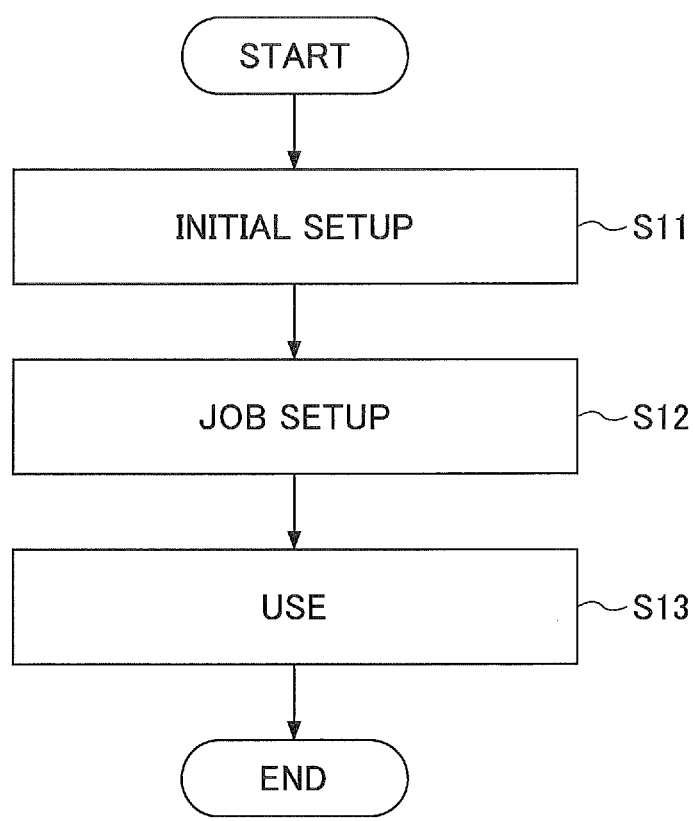
FIG. 5 is a flowchart of an exemplary web service introducing procedure.

A web service is introduced by a procedure illustrated in, for example, FIG. 5. FIG. 5 is a flowchart of an exemplary web service introducing procedure. In step S11, an administrator accesses the web service providing apparatus 22 using the terminal apparatus 14 and performs an initial setup. The initial setup causes the external service providing system 30 to be in a usable state such as for a registration of the external service to be used.

After the initial setup in step S11, the administrator or the user accesses the external service providing system 30 through the terminal apparatus 14 and performs a job setup in step S12. The job setup causes the image forming apparatus 12 to perform the job execution. Within the first embodiment, as described later, a spreadsheet of the external service providing system 30 is used for an input of the job setup and a data source of an address book or the like. After the job setup in step S12, the user can use the web service in the image forming apparatus 12.

In step S13, the user uses the web service in the image forming apparatus 12 based on the job setup in step S12. For example, the image forming apparatus 12 acquires job setup information from the external service providing system 30 and provides the web service using the job setup information.

<<Initial Setup and Job Setup>>

Figure 6:
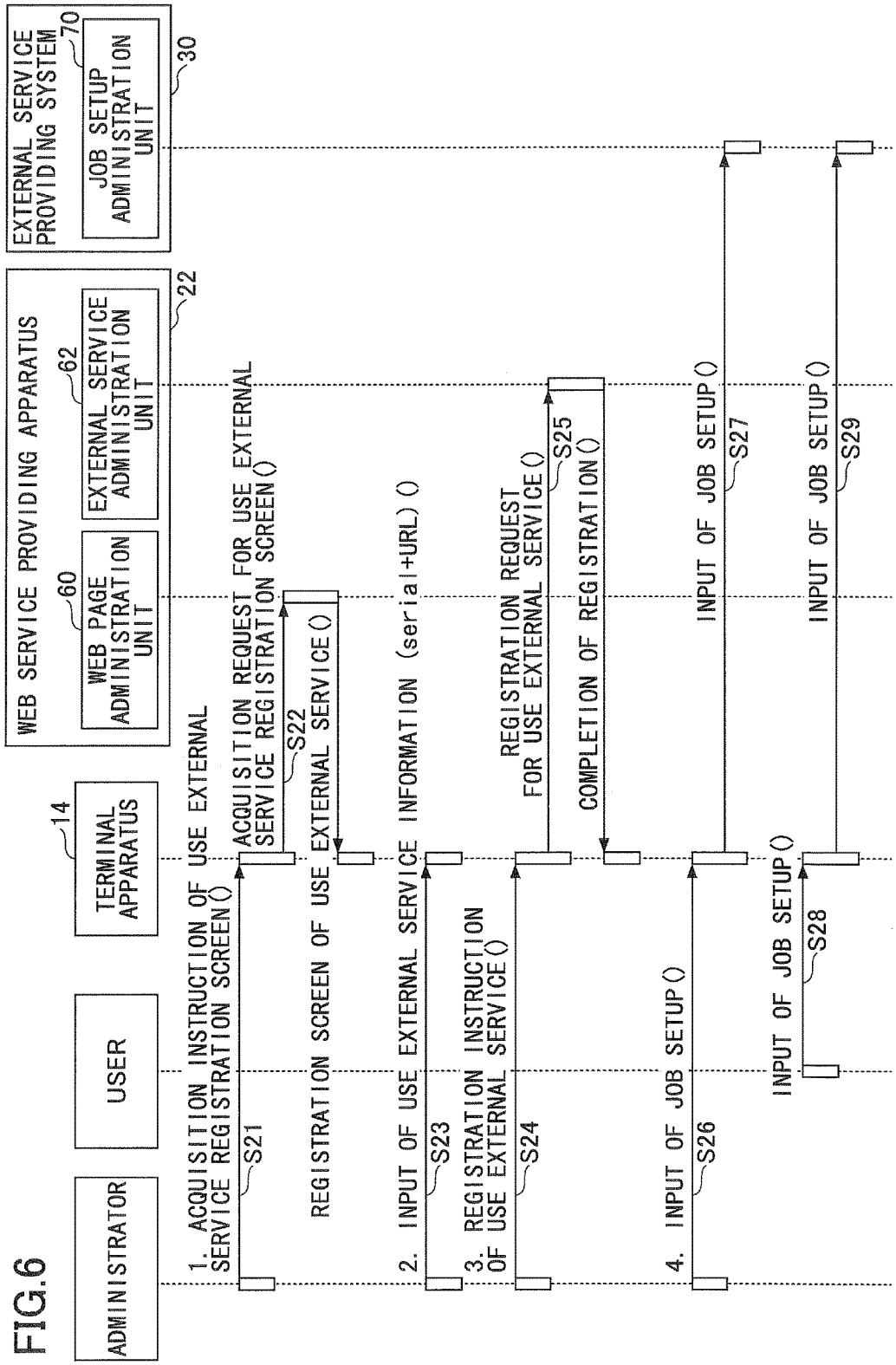
FIG. 6 is a sequence diagram of an exemplary initial setup process and an exemplary job setup process.

FIG. 6 is a sequence diagram of an exemplary initial setup process and an exemplary job setup process. In step S21, the administrator operates the terminal apparatus 14 to send an acquisition instruction of a use external service registration screen for registering an external service to be used.

In step S22, the terminal apparatus 14 accesses the web service providing apparatus 22 to send an acquisition request for a use external service registration screen. Thus, the terminal apparatus 14 acquires the use external service registration screen from the web page administration unit 60 of the web service providing apparatus 22. The terminal apparatus 14 displays the use external service registration screen on, for example, the browser.

In step S23, the administrator operates the terminal apparatus 14 and inputs serial information and an external service URL onto the displayed use external service registration screen. In step S24, the administrator operates the terminal apparatus 14 and sends a registration instruction of a use external service.

In step S25, the terminal apparatus 14 accesses the web service providing apparatus 22 and sends a registration request for the use external service. The external service administration unit 62 of the web service providing apparatus 22 registers the serial information and the external service URL (the use external service information) while associating these. After the use external service information is completely registered, the external service administration unit 62 returns information of the registration completion to the terminal apparatus 14.

In steps S26 and S27, the administrator operates the terminal apparatus 14 to access the external service providing system 30 and input the job setup information. For example, the administrator inputs job setup information into the spreadsheet administered by the external service providing system 30.

The user may input the job setup information. In steps S28 and S29, the user operates the terminal apparatus 14 to access the external service providing system 30 and input the job setup information. For example, the user inputs job setup information into the spreadsheet administered by the external service providing system 30. The job setup information is described in detail later. As described, according to the sequence diagram illustrated in FIG. 6, the external service to be used may be administered by the web service providing apparatus 22.

<<Usage>>

Figure 7:
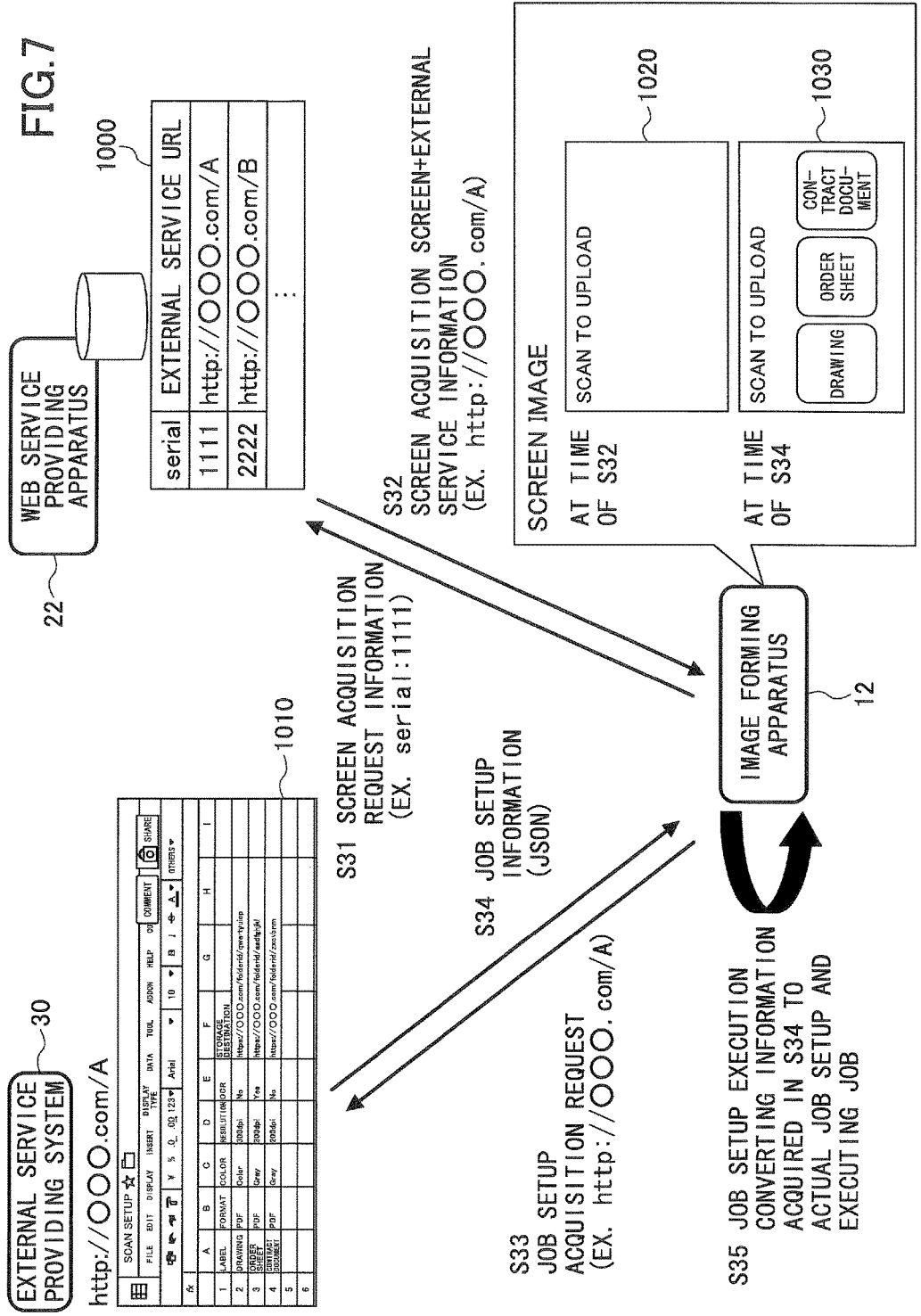
FIG. 7 schematically illustrates an exemplary web service using process.

For example, the user uses the web service in the image forming apparatus 12 as illustrated in FIG. 7. FIG. 7 schematically illustrates an exemplary web service using process. At first, the user operates the image forming apparatus 12 to send an acquisition instruction of a job execution screen.

In step S31, the image forming apparatus 12 requests the web service providing apparatus 22 to acquire the job execution screen while designating the serial information. The web service providing apparatus 22 administers an information table 1000 of the use external service. The web service providing apparatus 22 reads an external service URL (the use external service information) corresponding to the serial information designated by the image forming apparatus 12 from the information table 1000 of the use external service.

In step S32, the image forming apparatus 12 acquires the job execution screen data and the use external service information from the web service providing apparatus 22. The image forming apparatus 12 uses the use external service information to send an acquisition request for job setup information to the external service providing system 30.

The external service providing system 30 reads the job setup information from a spreadsheet 1010 specified by the use external service information, and provides the job setup information in a form of, for example, JavaScript Object Notation (JSON) ("JavaScript" is a registered trademark) being an exemplary data description language to the image forming apparatus 12.

In step S35, the image forming apparatus 12 depicts a button or the like for causing the user to select the job on the job execution screen based on the job setup information provided by the external service providing system 30. For example, the image forming apparatus 12 can display the job execution screen 1020 at a time point where the job execution screen data is acquired in step S32. Because the job setup information is not provided yet, the button or the like for causing the user to select the job is not displayed on the job execution screen 1020.

Meanwhile, the image forming apparatus 12 may display the job execution screen 1030 at a time point where the job setup information is acquired in step S34. Because the job setup information is already provided, the button or the like for causing the user to select the job is displayed on the job execution screen 1030. When the job is selected by the user, the image forming apparatus 12 reflects the job setup information in the parameter of the job execution. The image forming apparatus 12 executes the job based on the parameter of the job execution, in which the job setup information is reflected.

Figure 8:
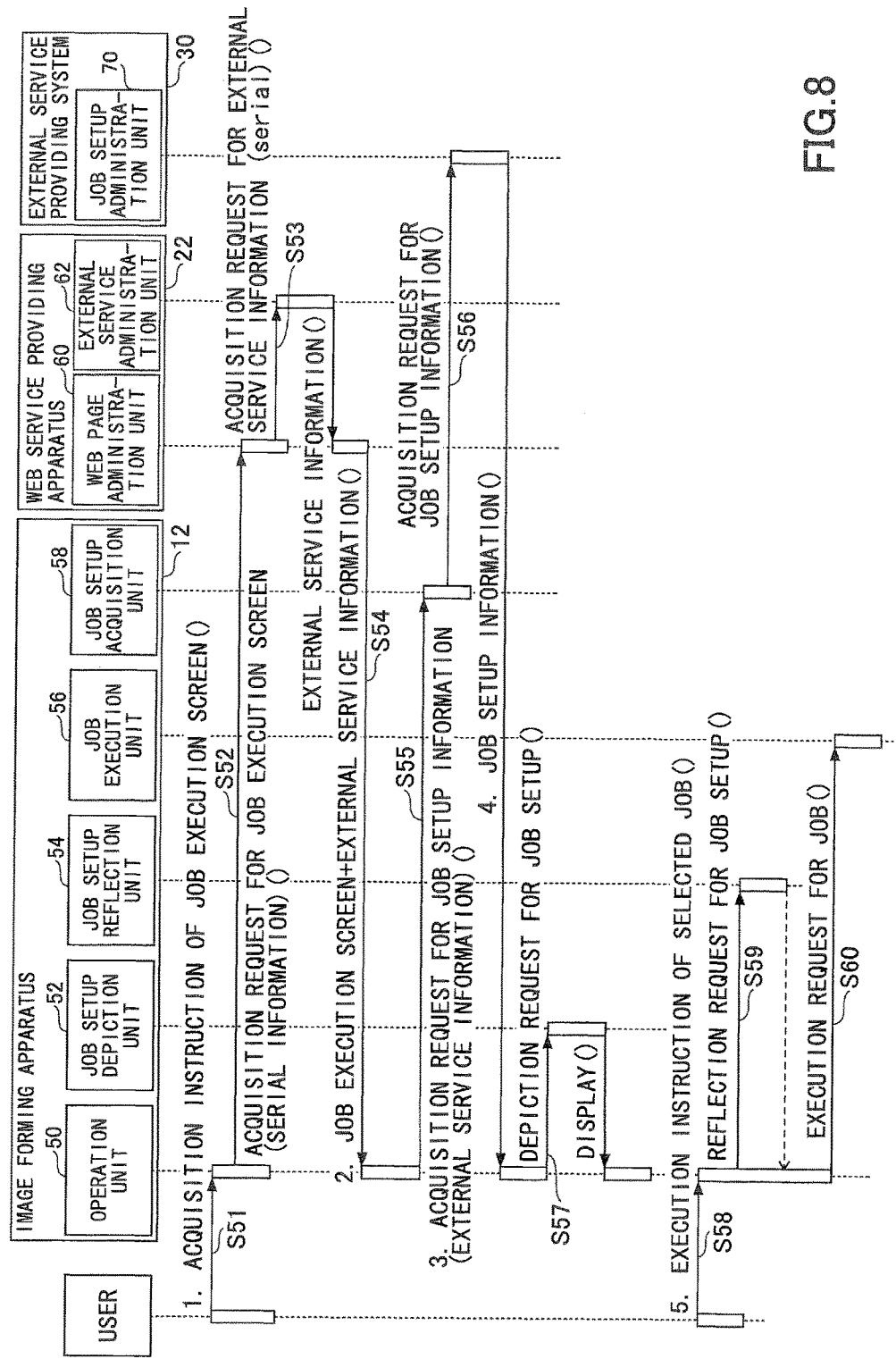
FIG. 8 is a sequence diagram of the exemplary web service using process.

FIG. 8 is a sequence diagram of the exemplary web service using process. In step S51, the operation unit 50 of the image forming apparatus 12 receives the acquisition instruction of the job execution screen from the user. In step S52, the operation unit 50 requests the web service providing apparatus 22 to acquire the job execution screen while designating the serial information.

The web page administration unit 60 of the web service providing apparatus 22 sends the acquisition request for the use external service information to the external service administration unit 62 while designating the serial information designated by the image forming apparatus 12. The external service administration unit 62 administers the use external service information as illustrated in, for example, FIG. 9.

FIG. 9 illustrates an exemplary structure of the information table of the use external service. In the information table of the use external service illustrated in FIG. 9, the serial information and the external service URL (the use external service information) are registered while associating these based on the above described registration request for the use external service. In the information table of the use external service illustrated in FIG. 9, the serial information is associated with the external service URL. However, for example, information associated with an authenticated user may be associated with the external service URL and registered.

The external service administration unit 62 reads the external service URL corresponding to the serial information designated by the image forming apparatus 12 from the information table of the use external service illustrated in FIG. 9 and provides the read external service URL to the web page administration unit 60. In step S54, the web page administration unit 60 provides the job execution screen data and the external service URL to the image forming apparatus 12.

The operation unit 50 of the image forming apparatus 12 sends an acquisition request for the job setup information to the job setup acquisition unit 58 by designating the external service URL acquired from the web service providing apparatus in step S55. In step S56, the job setup acquisition unit 58 sends an acquisition request for the job setup information to the external service providing system 30 while designating the external service URL.

The job setup administration unit 70 of the external service providing system 30 reads the job setup information from the spreadsheet specified by the external service URL and illustrated by, for example, FIG. 10. FIG. 10 illustrates an image of an exemplary spreadsheet in which the job setup information is registered.

The spreadsheet of FIG. 10 illustrates an example of job setup information of a scan to upload service (a cloud scan service) storing scanned image data into a preset storage destination. The spreadsheet of FIG. 10 has items of the job setup information, namely, a label, a format, a color, a resolution, OCR, and a storage destination.

Figure 11:
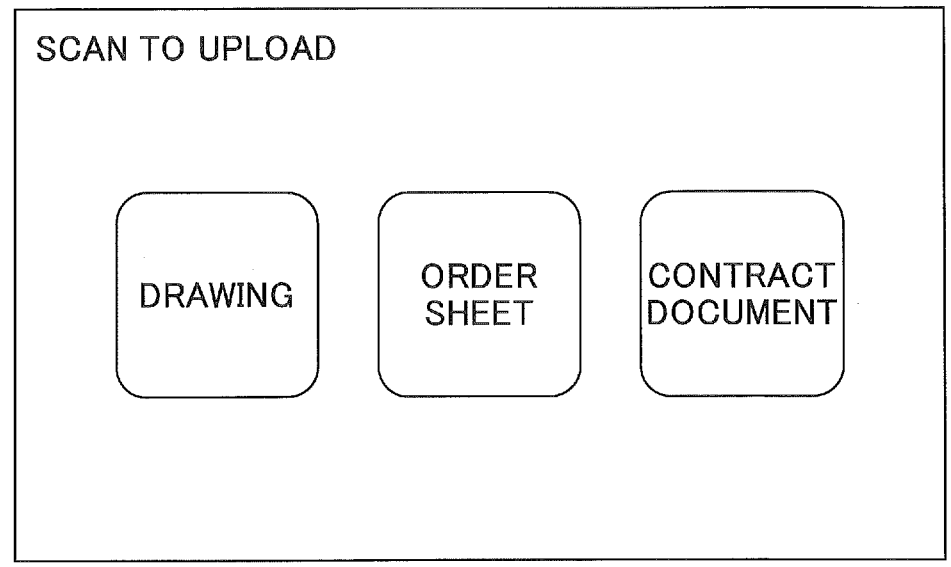
FIG. 11 illustrates an image of an exemplary button displayed on a job execution screen for causing a user to select a job.

The label is information displayed above a button of the job execution screen. In a case of the job setup information of the spreadsheet illustrated in FIG. 10, the job setup depiction unit 52 displays buttons on the job execution screen as illustrated in FIG. 11. FIG. 11 illustrates an image of an exemplary button displayed on the job execution screen for causing the user to select the job.

Referring back to FIG. 10, the format, the color, and the resolution are an example of the scan setup provided for the image forming apparatus 12 to scan. The OCR is a setup whether an optical character recognition (OCR) process is provided to the image data read from an original manuscript. The storage destination is a setup of a storage destination of image data read from the original manuscript.

Referring back to FIG. 8, the job setup administration unit 70 of the external service providing system 30 provides the job setup information read out of the spreadsheet, which is specified by the external service URL and illustrated, for example, FIG. 10, to the image forming apparatus 12 in a form of JSON.

In step S57, the operation unit 50 of the image forming apparatus 12 depicts the button or the like for causing the user to select the job on the job execution screen based on the job setup information provided by the external service providing system 30.

In step S58, the user selects the button corresponding to the job, which is to be executed, on the job execution screen illustrated in FIG. 11 and pushes the selected button. When the job is selected by the user, the operation unit 50 of the image forming apparatus 12 sends a reflection request of the job setup information to the job setup reflection unit 54.

Figure 12:
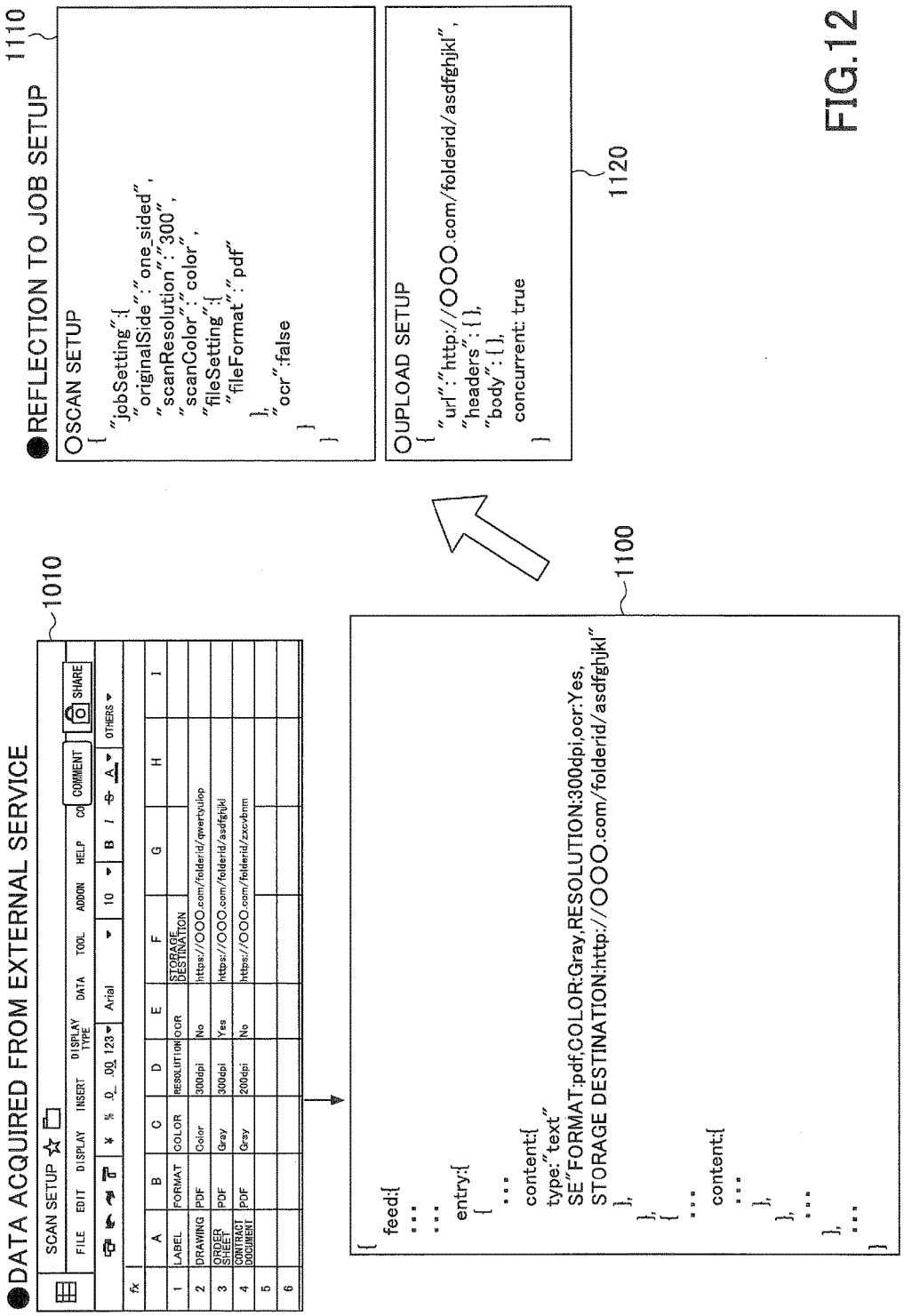
FIG. 12 schematically illustrates an exemplary process of reflecting job setup information in a parameter of a job execution.

The job setup reflection unit 54 reflects the job setup information in the parameter of the job execution by a procedure illustrated in, for example, FIG. 12. FIG. 12 schematically illustrates an exemplary process of reflecting the job setup information in the parameter of the job execution.

The job setup administration unit 70 of the external service providing system 30 reads the job setup information from, for example, the spreadsheet 1010. FIG. 12 illustrates the job setup information 1100 of a label of "drawing" among the job setup information read out of the spreadsheet 1010.

The job setup administration unit 70 provides the job setup information read out of the spreadsheet 1010 in, for example, a form of JSON, to the image forming apparatus 12. The operation unit 50 of the image forming apparatus 12 depicts the button using a label of the job setup information provided by the external service providing system 30 on the job execution screen as illustrated in, for example, FIG. 11.

When the job is selected by the user, the job setup reflection unit 54 of the image forming apparatus 12 reflects the job setup information in the parameter of the job execution. Illustrated in FIG. 12 is an example where the job having a label of "drawing" is selected. The job setup reflection unit 54 reflects the job setup information of the label "drawing" in the parameter of the scan setup information 1110 and the parameter of the upload setup information 1120.

Referring back to FIG. 8, the image forming apparatus 12 requests the job execution unit 56 to execute the job in step S60. The job execution unit 56 executes the job based on scan setup information 1110 and upload setup information 1120, in which the job setup information is reflected in the parameter.

As described, within the first embodiment, the job setup information is registered in the external service providing system 30 ordinarily used by the user. The user may easily perform a job setup through a familiar user interface (UI) for the ordinarily used external service providing system 30. Further, the user and the administrator may easily display the button for executing the set job on the job execution screen of the image forming apparatus 12 by providing the job setup to the external service providing system 30.

Further, within the first embodiment, the content of the job executed by the image forming apparatus 12 may be controlled based on job setup information registered in the external service providing system 30 which is ordinarily used by the user.

Second Embodiment

Within the first embodiment, the image forming apparatus 12 directly acquires job setup information from the external service providing system 30. Within a second embodiment, the image forming apparatus 12 acquires job setup information from the external service providing system 30 through the web service providing apparatus 22. Because the second embodiment is similar to the first embodiment except for a part of the second embodiment, explanation is appropriately omitted.

<Software Structure>

Figure 13:
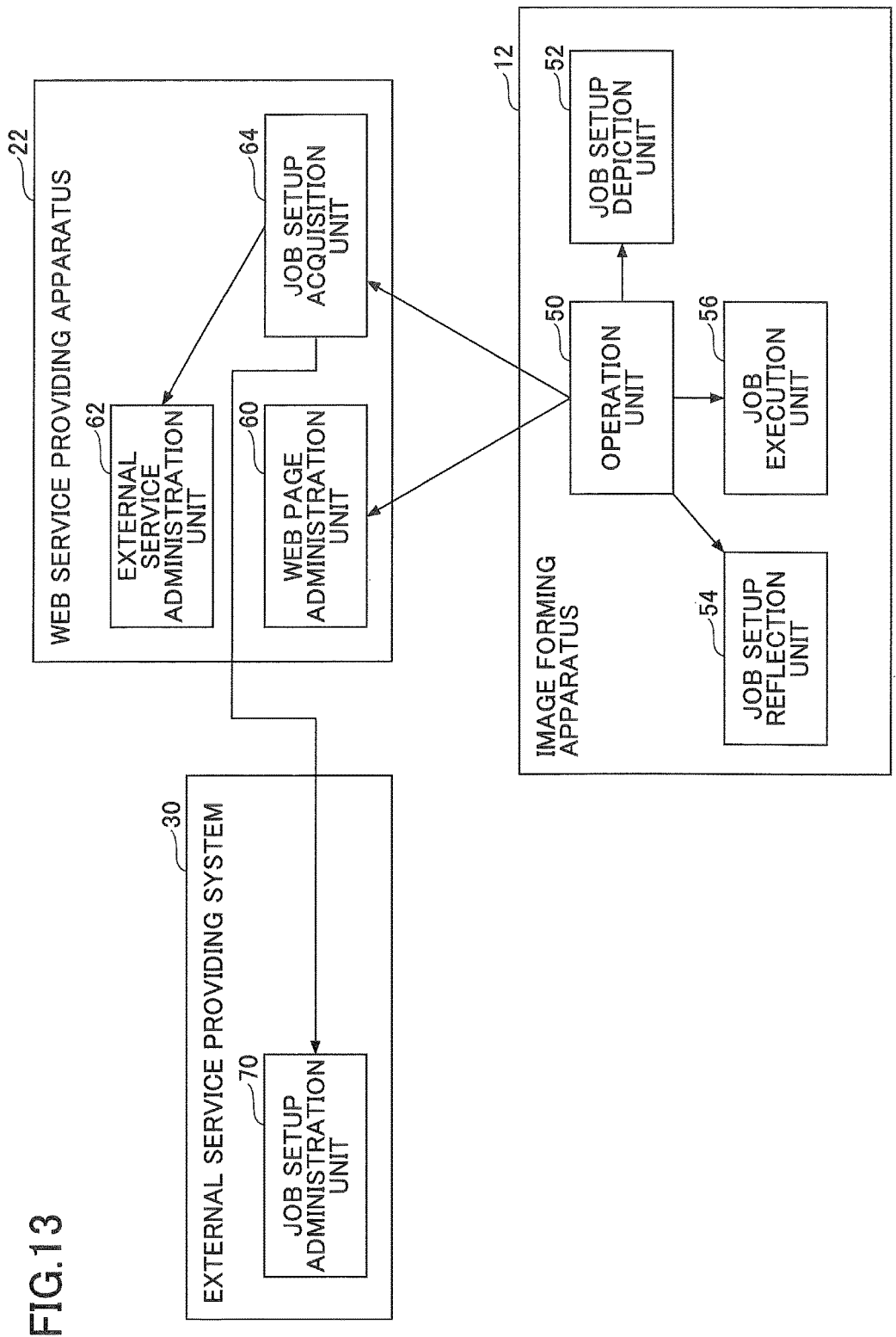
FIG. 13 illustrates a processing block diagram of an exemplary information processing system of a second embodiment.

The image forming apparatus 12, the web service providing apparatus 22, and the external service providing system 30 of the second embodiment are substantialized by a processing block diagram illustrated in, for example, FIG. 13. FIG. 13 is a processing block diagram of an exemplary information processing system of the second embodiment.

The processing block diagram illustrated in FIG. 13 differs from the processing block diagram illustrated in FIG. 4 at points that the image forming apparatus 12 does not includes the job setup acquisition unit 58 and a job setup acquisition unit 64 is added to the web service providing apparatus 22. Described here is a difference from the processing block diagram illustrated in FIG. 4.

The operation unit 50 of the image forming apparatus 12 acquires the job setup information from the job setup acquisition unit 64 of the web service providing apparatus 22. The external service administration unit 62 of the web service providing apparatus 22 provides the use external service information based on the acquisition request from the job setup acquisition unit 64.

The job setup acquisition unit 64 acquires job setup information from the job setup administration unit 70 of the external service providing system 30, and provides the acquired job setup information to the image forming apparatus 12. The job setup administration unit 70 of the external service providing system 30 provides job setup information based on an acquisition request from the web service providing apparatus 22.

<Detailed Process>

Next, a difference from the first embodiment as to a detailed process of the information processing system 1 of the second embodiment is described.

<<Introduction of Web Service>>

The second embodiment differs from the first embodiment at the process of step S13 illustrated in FIG. 5. Within the second embodiment, the image forming apparatus 12 acquires the job setup information from the external service providing system 30 through the web service providing apparatus 22 and provides a web service using the job setup information.

<<Usage>>

Figure 14:
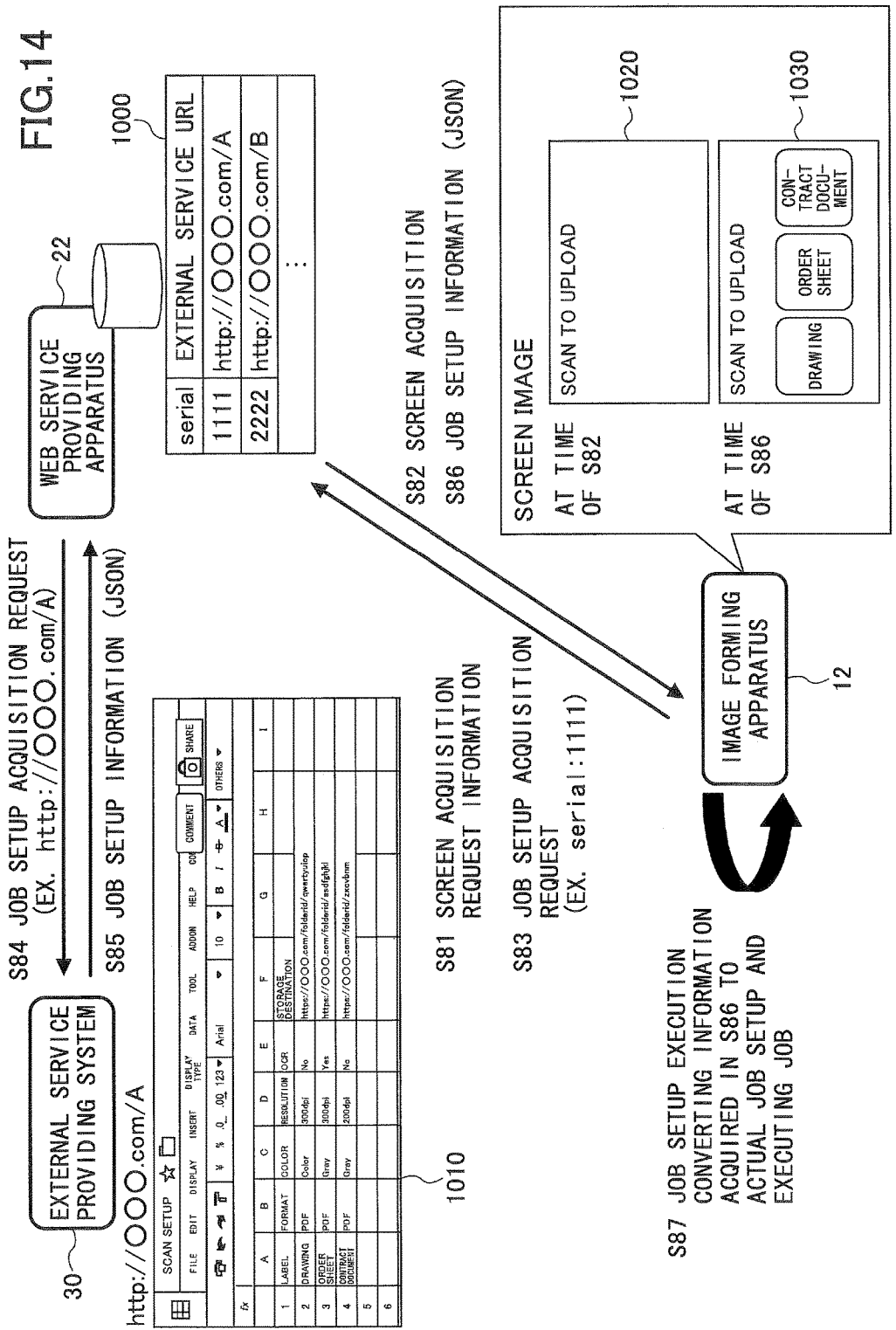
FIG. 14 schematically illustrates an exemplary web service using process of the second embodiment.

For example, the user uses the web service in the image forming apparatus 12 as illustrated in, for example, FIG. 14. FIG. 14 schematically illustrates an exemplary web service using process of the second embodiment. At first, the user operates the image forming apparatus 12 to send the acquisition instruction of the job execution screen.

In step S81, the image forming apparatus 12 requests the web service providing apparatus 22 to acquire the job execution screen. In step S82, the image forming apparatus 12 acquires the job execution screen data from the web service providing apparatus 22.

In step S83, the image forming apparatus 12 requests the web service providing apparatus 22 to acquire the job setup information while designating the serial information. The web service providing apparatus 22 administers an information table 1000 of the use external service. The web service providing apparatus 22 reads the external service URL (the use external service information) corresponding to the serial information designated by the image forming apparatus 12 from the information table 1000 of the use external service.

In step S84, the web service providing apparatus 22 uses the use external service information to send an acquisition request for the job setup information to the external service providing system 30. In step S85, the external service providing system 30 reads the job setup information from the spreadsheet 1010 specified by the use external service information and provides the job setup information of the form of JSON to the web service providing apparatus 22.

In step S86, the web service providing apparatus 22 provides the job setup information of the form of JSON to the image forming apparatus 12. In step S87, the image forming apparatus 12 depicts a button or the like for causing the user to select the job on the job execution screen based on the job setup information provided by the web service providing apparatus 22.

When the job is selected by the user, the image forming apparatus 12 reflects the job setup information in the parameter of the job execution. The image forming apparatus 12 executes the job based on the parameter of the job execution, in which the job setup information is reflected.

As described above, within the second embodiment, the image forming apparatus 12 acquires job setup information from the external service providing system 30 through the web service providing apparatus 22.

Third Embodiment

The first and second embodiments administer the external service (the use external service) used to administer the job setup information using the web service providing apparatus 22. Within the third embodiment, the use external service is administered by the external service providing system 30. Because the third embodiment is similar to the first and second embodiments except for a part of the third embodiment, explanation is appropriately omitted.

<Software Structure>

Figure 15:
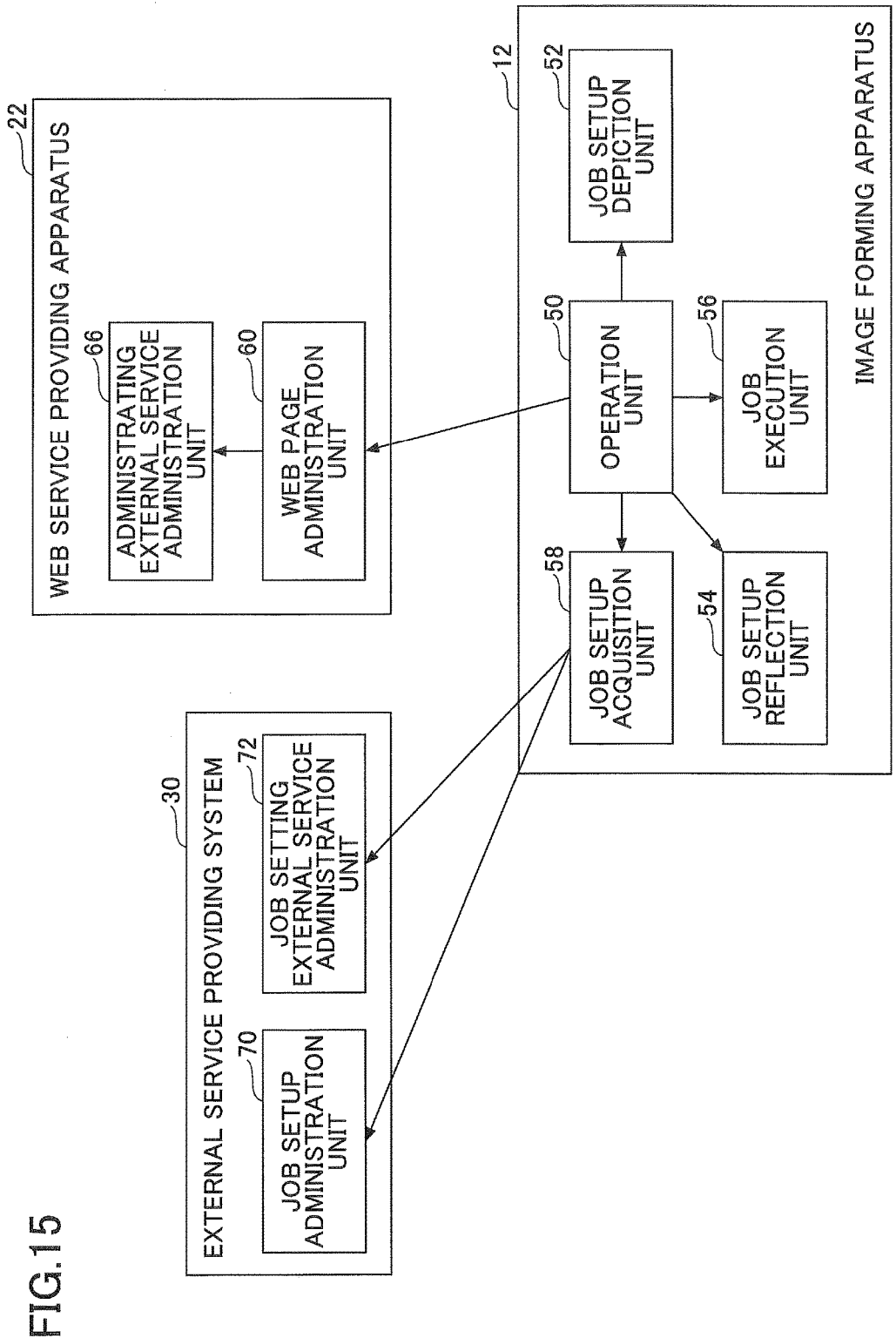
FIG. 15 is a processing block diagram of an exemplary information processing system of a third embodiment.

The image forming apparatus 12, the web service providing apparatus 22, and the external service providing system 30 of the third embodiment are substantialized a processing block diagram illustrated in, for example, FIG. 15. FIG. 15 is the processing block diagram of an exemplary information processing system of the third embodiment.

The processing block diagram illustrated in FIG. 15 differs from the processing block diagram illustrated in FIG. 4 at a point that the external service administration unit 62 of the web service providing apparatus 22 is replaced by an administrating external service administration unit 66 and a job setting external service administration unit 72 is added to the external service providing system 30. Described here is a difference from the processing block diagram illustrated in FIG. 4.

The operation unit 50 acquires an administrating external service URL (administrating external service information) from the web service providing apparatus 22. The job setup acquisition unit 58 uses the administrating external service URL and acquires an external service URL for a job setup (external service information for the job setup) from the job setting external service administration unit 72 of the external service providing system 30. Further, the job setup acquisition unit 58 acquires the job setup information from the job setup administration unit 70 of the external service providing system 30 using the external service URL for the job setup.

Further, the administrating external service administration unit 66 of the web service providing apparatus 22 administers administrating external service information. The administrating external service administration unit 66 provides administrating external service information based on an acquisition request from the web page administration unit 60. The job setting external service administration unit 72 of the external service providing system 30 provides the external service information for the job setup based on an acquisition request from the image forming apparatus 12. The job setup administration unit 70 provides the job setup information based on the acquisition request from the image forming apparatus 12.

<Detailed Process>

Hereinafter, a detailed process of the information processing system 1 of the third embodiment is described.

<<Introduction of Web Service>>

Within the third embodiment, the administrating external service information and the external service information for the job setup are registered in step S11 illustrated in FIG. 5. The administrator uses the terminal apparatus 14 to access the web service providing apparatus 22 and registers the administrating external service information in the administrating external service administration unit 66 of the web service providing apparatus 22. Further, the administrator uses the terminal apparatus 14 to access the external service providing system 30 and registers the external service information for the job setup in the job setting external service administration unit 72 of the external service providing system 30.

After the initial setup in step S11, the administrator or the user accesses the external service providing system 30 through the terminal apparatus 14 and performs a job setup in step S12. In step S13, the user uses the web service in the image forming apparatus 12 based on the job setup in step S12. For example, the image forming apparatus 12 uses the administrating external service information and the external service information for the job setup, which are registered in the initial setup, so as to acquire job setup information from the external service providing system 30 and provide the web service sing the job setup information.

<<Initial Setup and Job Setup>>

Figure 16:
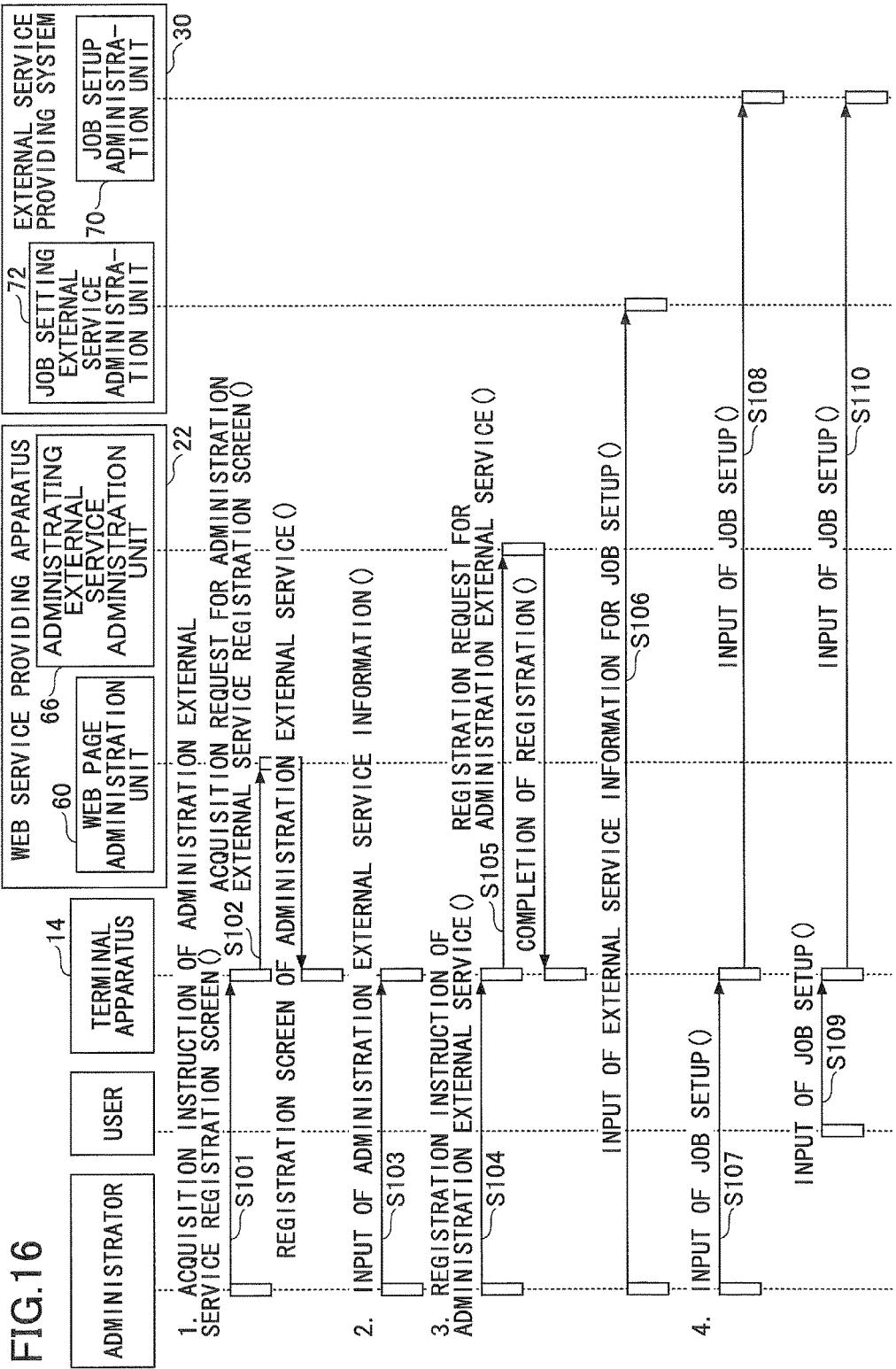
FIG. 16 is a sequence diagram of an exemplary initial setup process and an exemplary job setup process of the third embodiment.

FIG. 16 is a sequence diagram of an exemplary initial setup process and an exemplary job setup process of the third embodiment. Because the sequence diagram illustrated in FIG. 16 is similar to the sequence diagram illustrated in FIG. 6 except for a part, the description is appropriately omitted.

In step S101, the administrator operates the terminal apparatus 14 and sends an acquisition instruction of an administration external service registration screen for registering the administrating external service information. In step S102, the terminal apparatus 14 accesses the web service providing apparatus 22 to send an acquisition request for the administration external service registration screen. Thus, the terminal apparatus 14 acquires the administration external service registration screen from the web page administration unit 60 of the web service providing apparatus 22. The terminal apparatus 14 displays the administration external service registration screen on, for example, the browser.

In step S103, the administrator operates the terminal apparatus 14 and inputs serial information and an external service URL onto the displayed administration external service registration screen. In step S104, the administrator operates the terminal apparatus 14 and sends a registration instruction of the administrating external service information.

In step S105, the terminal apparatus 14 accesses the web service providing apparatus 22 and sends a registration request for the administrating external service information. Further, the administrating external service administration unit 66 of the web service providing apparatus 22 registers the serial information and the administrating external service URL while associating these. After the administrating external service information is completely registered, the administrating external service administration unit 66 returns information of the registration completion to the terminal apparatus 14.

In step S106, the administrator operates the terminal apparatus 14 to access the job setting external service administration unit 72 of the external service providing system 30 specified by the administrating external service URL and registers the external service URL for the job setup.

In steps S107 and S108, the administrator operates the terminal apparatus 14 to access the external service providing system 30 and input the job setup information. For example, the administrator inputs the job setup information to the spreadsheet of the external service providing system 30 specified by the external service URL for the job setup.

The user may input the job setup information as in steps S109 and S110. According to the sequence diagram illustrated in FIG. 16, the use external service is administered by the external service providing system 30.

<<Usage>>

Figure 17:
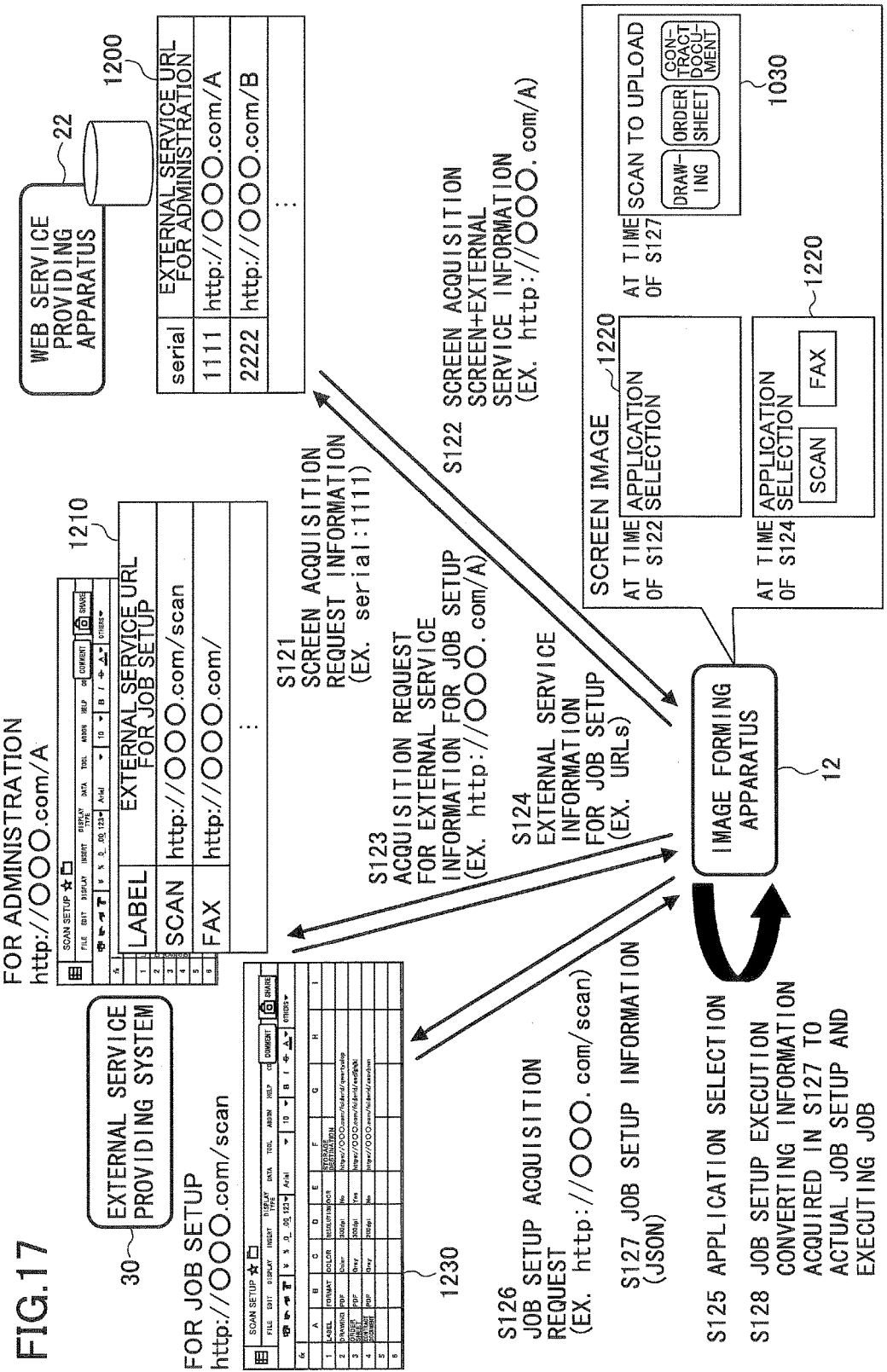
FIG. 17 schematically illustrates an exemplary web service using process of the third embodiment.

Within the third embodiment, the user uses the web service in the image forming apparatus 12 as illustrated in, for example, FIG. 17. FIG. 17 schematically illustrates an exemplary web service using process of the third embodiment. At first, the user operates the image forming apparatus 12 to send an acquisition instruction of the job execution screen and the application selection screen.

In step S121, the image forming apparatus 12 requests the web service providing apparatus 22 to acquire the job execution screen and the application selection screen while designating the serial information. The web service providing apparatus 22 administers an administering external service information table 1200. The web service providing apparatus 22 reads the administrating external service URL (the administrating external service information) corresponding to the serial information designated by the image forming apparatus 12 from the administering external service information table 1200.

In step S122, the image forming apparatus 12 acquires the job execution screen data, application selection screen data, and the administrating external service information from the web service providing apparatus 22. In step S123, the image forming apparatus 12 uses the administrating external service information to request the external service providing system 30 to acquire the external service information for the job setup.

The external service providing system 30 reads label information and the external service information for the job setup from the spreadsheet 1210 specified by the administrating external service information. In step S124, the external service providing system 30 provides the read label information and the external service information for the job setup to the image forming apparatus 12.

The image forming apparatus 12 displays the application selection screen 1220 while using the label information provided by the external service providing system 30. The application selection screen 1220 displays a button or the like for causing the user to select scan or fax.

In step S125, when the user selects scan or fax, the image forming apparatus 12 proceeds to the process of step S126. In step S126, the image forming apparatus 12 sends an acquisition request for the job setup information to the external service providing system 30 while using the external service information for the job setup corresponding to the label information selected by the user.

The external service providing system 30 reads the job setup information from a spreadsheet 1230 specified by the external service information for the job setup and provides the job setup information in the form of JSON to the image forming apparatus 12.

In step S127, the image forming apparatus 12 depicts a button or the like for causing the user to select the job on the job execution screen based on the job setup information provided by the external service providing system 30. For example, the image forming apparatus 12 can display the application selection screen 1220 at a time point when the label information and the external service information for the job setup are acquired in step S124.

The job execution screen 1030 displays a button or the like for causing the user to select the job. When the job is selected by the user, the image forming apparatus 12 reflects the job setup information in the parameter of the job execution. The image forming apparatus 12 executes the job based on the parameter of the job execution, in which the job setup information is reflected.

Within the third embodiment, the use external service may be administered by the external service providing system 30.

[Other Embodiments]

Within the first to third embodiments, the described example is that the job setup information is acquired from the external service providing system 30 and a job of scan to upload is executed by the image forming apparatus 12. The information processing system 1 of the embodiments may executes a job of fax using the image forming apparatus 12 by acquiring the job setup information as illustrated in FIG. 18 from the external service providing system 30.

FIG. 18 illustrates an image of an exemplary spreadsheet in which the job setup information is registered. Referring to FIG. 18, the spreadsheet includes job setup information of fax used to fax to a selected fax number.

The spreadsheet illustrated in FIG. 18 includes the label, pronunciation, and the fax number as items of the job setup information. The label is the name of an destination user displayed on the job execution screen. The fax number is an address displayed on the job execution screen.

For example, in a case of the job setup information of the spreadsheet illustrated in FIG. 18, the job setup depiction unit 52 displays the job execution screen as illustrated in FIG. 19. FIG. 19 illustrates an image of an exemplary job execution screen for the fax. For example, the user selects the destination user from the job execution screen illustrated in FIG. 19 and pushes a button of "start" so as to start the execution of the job of fax.

Additionally, the image forming apparatus 12 of the information processing system 1 of the embodiments may execute the following jobs. For example, the image forming apparatus 12 may execute a job of performing the OCR at a time of fax transmission and stopping the fax transmission if a word described in the job setup information of the external service providing system 30 such as "internal consumption".

Further, the image forming apparatus 12 may execute a job of recording an outgoing message history of transmitted fax transmission in a calendar service described in job setup information of the external service providing system 30.

Further, the information processing system 1 of the embodiments may acquire a data source such as an address book and a file in a folder, which are specified by the job setup information, from the external service providing system 30 to execute the job.

For example, the image forming apparatus 12 may execute a job of downloading and printing a file in a folder specified by the job setup information of the external service providing system 30. Further, the image forming apparatus 12 may execute a job of using the address book specified by the job setup information of the external service providing system 30 to perform scan to mail.

Further, the image forming apparatus 12 may execute a job of generating meta data in scanning in conformity with the job setup information of the external service providing system 30 and storing the meta data and scan data in a storage destination designated by the job setup information.

In the information processing system 1 of the embodiments, an authentication unit may be added to the processing block diagrams illustrated in FIGS. 4, 13, and 15. Referring to FIGS. 4 and 15, in a case where the image forming apparatus 12 accesses the external service providing system 30, the authentication unit is added to the image forming apparatus 12. Further, referring to FIG. 13, in a case where the web service providing apparatus 22 accesses the external service providing system 30, the authentication unit is added to the web service providing apparatus 22.

In the information processing system 1 of the embodiments, in a case where it is necessary to log in the external service providing system 30, an existing authentication by OpenID Connect or using an OAuth token may be used.

Figure 20:
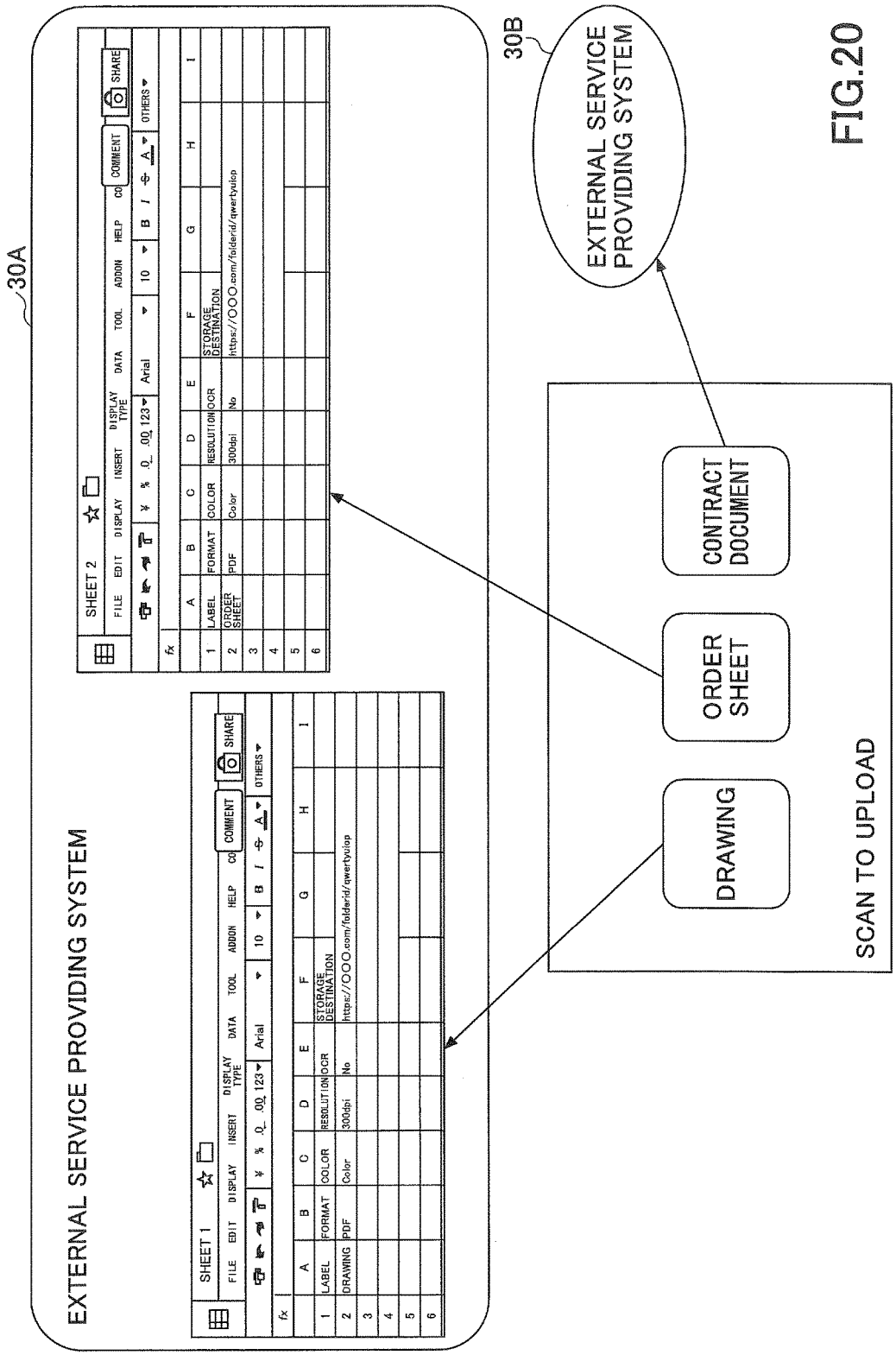
FIG. 20 illustrates an image of an exemplary process of displaying a button from multiple spreadsheets on a job execution screen.

Although multiple buttons are depicted on the job execution screen illustrated in FIG. 11 using the job setup information in one spreadsheet, the buttons may be depicted on the job execution screen using the job setup information in multiple spreadsheets as illustrated in FIG. 20.

FIG. 20 illustrates an image of an exemplary process of displaying the button from multiple spreadsheets on the job execution screen. Referring to FIG. 20, the spreadsheets are acquired from multiple external service providing system 30A and 30B. When the user registers a scan setup and a storage destination in the spreadsheet of the external service providing system 30A or 30B as the job setup information, jobs having different scan setups and different storage destinations for each button may be executed by the job execution screen illustrated in FIG. 20.

Although the first to third embodiments describe an example where the administrator performs various setups for causing the image forming apparatus 12 to acquire the job setup information, the spreadsheet of the external service providing system 30 registering the job setup information may be fixed. Then, at least when the administrator or the user inputs the job setup information into the fixed spreadsheet of the external service providing system 30 registering the job setup information, the job based on the job setup information may be executed.

Although, in the first to third embodiments, the job setup information is acquired from the external service providing system 30 after the user sends the acquisition instruction of the job execution screen, a timing is not limited to the timing after the user sends the acquisition instruction. For example, the image forming apparatus 12 may acquire at each predetermined time or at each start-up.

Further, in the first to third embodiments, the processing blocks included in the image forming apparatus 12 and the web service providing apparatus 22 may be integrated into the image forming apparatus 12.

<General Overview>

The information processing system 1 of the embodiments may cause the content of the job executed by the image forming apparatus 12 to be controlled by the job setup information, which is provided for the job execution and registered in the external service providing system 30.

Further, because the information processing system 1 of the embodiments can register the job setup information in the external service providing system 30, which is ordinarily used by the user, the job setup may be easily performed using the familiar UI. As described, the user and the administrator may perform the job setup using the familiar UI. Further, a provider providing the web service may not develop an UI for the job setup.

The electronic apparatus recited in the claims corresponds to, for example, the image forming apparatus 12. The information processing apparatus recited in the claims corresponds to, for example, the web service providing apparatus 22. The acquisition destination information administration unit recited in the claims corresponds to, for example, the external service administration unit 62. The setup information acquisition unit recited in the claims corresponds to, for example, the job setup acquisition unit 58. The setup information reflection unit recited in the claims corresponds to, for example, the job setup reflection unit 54.

The first information processing apparatus recited in the claims corresponds to, for example, the web service providing apparatus 22. The second information processing apparatus recited in the claims corresponds to, for example, the external service providing system 30. The first administration unit recited in the claims corresponds to, for example, the administrating external service administration unit 66. The second administration unit recited in the claims corresponds to, for example, the job setting external service administration unit 72. The depiction unit recited in the claims corresponds to, for example, the job setup depiction unit 52.

[Appendix]

[1] An information processing system including an electronic apparatus and at least one information processing apparatus which are connected through a network, the information processing system comprising:

an acquisition destination information administration unit configured to administer acquisition destination information of setup information for an execution of a job in the electronic apparatus;

a setup information acquisition unit configured to acquire the setup information from an acquisition destination specified by the acquisition destination information acquired from the acquisition destination information administration unit; and a setup information reflection unit configured to control a content of the job executed by the electronic apparatus based on a content of the setup information.

[2] The information processing system according to [1], wherein the acquisition destination information administration unit is included in a first information processing apparatus, which is included in the at least one information processing apparatus and is configured to provide a first service, wherein the setup information acquisition unit acquires the setup information from a second information processing apparatus, which is configured to provide a second service different from the first service and is specified by the acquisition destination information.

[3] The information processing system according to [1], wherein the acquisition destination information administration unit includes a first administration unit configured to administer an acquisition destination of the acquisition destination information in a first information processing apparatus, which is included in the at least one information processing apparatus and configured to provide a first service, and a second administration unit configured to administer the acquisition destination information in a second information processing apparatus, which is configured to provide a second service different from the first service and is specified by the acquisition destination information, wherein the setup information acquisition unit acquires the acquisition destination information from the second administration unit, which is the acquisition destination of the acquisition destination information acquired from the first administration unit.

[4] The information processing system according to any one of [1] to [3], the information processing system further comprising:

a depiction unit configured to depict an execution screen, through which a use instruction of the job to be executed by the electronic apparatus is received, based on the content of the setup information, wherein the setup information reflection unit controls the content of the job, of which the use instruction is received from a user, based on the content of the setup information.

[5] The information processing system according to any one of [1] to [4], wherein the acquisition destination information administration unit administers the acquisition destination information, a registration request of the acquisition destination information being received from a terminal apparatus connected to the information processing system through the network, and wherein the acquisition destination specified by the acquisition destination information administers the setup information received from the terminal apparatus.

[6] The information processing system according to any one of [1] to [5], the information processing system further comprising:

a first information processing apparatus, which is included in the at least one information processing apparatus and configured to provide a first service; and a second information processing apparatus, which is configured to provide a second service different from the first service and is specified by the acquisition destination information.

[7] The information processing system according to any one of [1] to [6], wherein the setup information reflection unit controls a content of an image forming process executed by the electronic apparatus and a storage destination or an address of image data generated by image forming process based on the setup information.

[8] The information processing system according to any one of [1] to [6], wherein the setup information reflection unit controls a content of an image forming process executed by the electronic apparatus and an acquisition destination of image data output by the image forming process based on the setup information.

[9] The information processing system according to any one of [1] to [8], wherein an acquisition destination specified by the acquisition destination information is a service providing system which provides a user interface for receiving a registration of the setup information from a user, and a storage area for storing the setup information received from the user interface.

[10] An information processing system including an electronic apparatus, a first information processing apparatus configured to provide a first service, and a second information processing apparatus configured to provide a second service different from the first service, wherein the first information processing apparatus comprises an acquisition destination information administration unit configured to administer acquisition destination information of setup information for an execution of a job in the electronic apparatus, and wherein the electronic apparatus comprises a setup information acquisition unit configured to acquire the setup information from an acquisition destination of the second information processing apparatus specified by the acquisition destination information acquired from the acquisition destination information administration unit; and a setup information reflection unit configured to control a content of the job executed by the electronic apparatus based on a content of the setup information.

[11] An information processing system including an electronic apparatus, a first information processing apparatus configured to provide a first service, and a second information processing apparatus configured to provide a second service different from the first service, wherein the first information processing apparatus comprises an acquisition destination information administration unit configured to administer acquisition destination information of setup information for an execution of a job in the electronic apparatus, and a setup information acquisition unit configured to acquire the setup information from an acquisition destination of the second information processing apparatus specified by the acquisition destination information acquired from the acquisition destination information administration unit, and wherein the electronic apparatus comprises a setup information reflection unit configured to control a content of the job executed by the electronic apparatus based on a content of the setup information.

[12] An information processing system including an electronic apparatus, a first information processing apparatus configured to provide a first service, and a second information processing apparatus configured to provide a second service different from the first service, wherein the first information processing apparatus comprises a first administration unit configured to administer an acquisition destination of the acquisition destination information for an execution of a job in the electronic apparatus, wherein the second information processing apparatus comprises a second administration unit configured to administer the acquisition destination information for the execution of the job in the electronic apparatus, and wherein the electronic apparatus comprises a setup information acquisition unit configured to acquire the acquisition destination information from the second information processing apparatus being the acquisition destination of the acquisition destination information acquired from the first administration unit and to acquire the setup information from an acquisition destination of the second information processing apparatus specified by the acquisition destination information acquired from the acquisition destination information administration unit, and a setup information reflection unit configured to control a content of the job executed by the electronic apparatus based on a content of the setup information.

[13] An electronic apparatus connected to at least one information processing apparatus through a network, the electronic apparatus comprising:

an acquisition destination information administration unit configured to administer acquisition destination information of setup information for an execution of a job in the electronic apparatus;

a setup information acquisition unit configured to acquire the setup information from an acquisition destination specified by the acquisition destination information acquired from the acquisition destination information administration unit; and a setup information reflection unit configured to control a content of the job executed by the electronic apparatus based on a content of the setup information.

[14] A non-transitory computer-readable storage medium storing a program, the program being executed by a processor in an electronic apparatus connected to at least one information processing apparatus through a network, the program being executed by the processor to cause the electronic apparatus to implement:

an acquisition destination information administration unit configured to administer acquisition destination information of setup information for an execution of a job in the electronic apparatus, a setup information acquisition unit configured to acquire the setup information from an acquisition destination specified by the acquisition destination information acquired from the acquisition destination information administration unit, and a setup information reflection unit configured to control a content of the job executed by the electronic apparatus based on a content of the setup information.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No 2014-249259, filed on Dec. 9, 2014, and the Japanese Patent Application No. 2015-231945, filed on Nov. 27, 2015, the entire contents of which are incorporated herein by reference.

What is claimed is:

1. An information processing system including an image forming apparatus and at least one information processing apparatus which are coupled through a network, wherein the at least one information processing apparatus comprises a first hardware processor and a first hardware memory implementing an acquisition destination information administration unit configured to administer acquisition destination information of setup information for an execution of a print job executed in the image forming apparatus, the setup information specifying an output data acquisition destination from which output data is to be acquired; and a setup information acquisition unit configured to acquire the setup information from an acquisition destination specified by the acquisition destination information acquired from the acquisition destination information administration unit, wherein the image forming apparatus comprises a second hardware processor and a second hardware memory implementing a setup information reflection unit configured to receive the setup information;

a depiction unit configured to depict a print job selection button for causing a user to select the print job by using a content of the setup information on a print job execution screen previously acquired from the at least one information processing apparatus so as to generate another print job execution screen; and a print job execution unit that executes the selected print job and acquires the output data from the output data acquisition destination specified in the received setup information, wherein the acquisition destination information administration unit is included in a first information processing apparatus, which is included in the at least one information processing apparatus and is configured to provide a first service, wherein the setup information acquisition unit acquires the setup information from a second information processing apparatus, which is configured to provide a second service different from the first service and is specified by the acquisition destination information, and wherein the setup reflection unit modifies parameters of the print job executed in the image forming apparatus based on the received setup information.

2. The information processing system according to claim 1,
wherein the setup information reflection unit controls the content of the print job, of which a use instruction is received from the user, based on the content of the setup information.

3. The information processing system according to claim 1,
wherein the acquisition destination information administration unit administers the acquisition destination information, a registration request of the acquisition destination information being received from a terminal apparatus coupled to the information processing system through the network, and
wherein the acquisition destination specified by the acquisition destination information administers the setup information received from the terminal apparatus.

4. The information processing system according to claim 1,
wherein an acquisition destination specified by the acquisition destination information is a service providing system which provides
a user interface for receiving a registration of the setup information from a user, and
a storage area for storing the setup information received from the user interface.

5. An image forming apparatus coupled to at least one information processing apparatus through a network, the image forming apparatus comprising
a hardware processor and a hardware memory that execute a program so as to implement:
a setup information reflection unit configured to receive setup information for an execution of a print job executed in the image forming apparatus from the at least one information processing apparatus, the setup information specifying an output data acquisition destination from which output data is to be acquired;
a depiction unit configured to depict a print job selection button for causing a user to select the print job by using a content of the setup information on a print job execution screen previously acquired from the at least one information processing apparatus so as to generate another print job execution screen; and
a print job execution unit that executes the selected print job and acquires the output data from the output data acquisition destination specified in the received setup information,
wherein the at least one information processing apparatus includes a first information processing apparatus that provides a first service,
wherein the at least one information processing apparatus acquires the setup information from a second information processing apparatus that provides a second service different from the first service, and
wherein the setup information reflection unit modifies parameters of the print job executed in the image forming apparatus based on the received setup information.

6. An information processing system including an image forming apparatus and at least one information processing apparatus which are coupled through a network,
wherein the at least one information processing apparatus comprises a first hardware processor and a first hardware memory implementing
an acquisition destination information administration unit configured to administer acquisition destination information of setup information for an execution of a scan job executed in the image forming apparatus, the setup information specifying an output data acquisition destination from which output data is to be acquired; and
a setup information acquisition unit configured to acquire the setup information from an acquisition destination specified by the acquisition destination information acquired from the acquisition destination information administration unit,
wherein the image forming apparatus comprises a second hardware processor and a second hardware memory implementing
a setup information reflection unit configured to receive the setup information;
a depiction unit configured to depict a scan job selection button for causing a user to select the scan job by using a content of the setup information on a scan job execution screen previously acquired from the at least one information processing apparatus so as to generate another scan job execution screen; and
a scan job execution unit that executes the selected scan job and acquires the output data from the output data acquisition destination specified in the received setup information,
wherein the acquisition destination information administration unit is included in a first information processing apparatus, which is included in the at least one information processing apparatus and is configured to provide a first service,
wherein the setup information acquisition unit acquires the setup information from a second information processing apparatus, which is configured to provide a second service different from the first service and is specified by the acquisition destination information, and
wherein the setup reflection unit modifies parameters of the scan job executed in the image forming apparatus based on the received setup information.

7. The information processing system according to claim 6,
wherein the setup information reflection unit controls the content of the scan job, of which a use instruction is received from the user, based on the content of the setup information.

8. The information processing system according to claim 6,
wherein the acquisition destination information administration unit administers the acquisition destination information, a registration request of the acquisition destination information being received from a terminal apparatus coupled to the information processing system through the network, and
wherein the acquisition destination specified by the acquisition destination information administers the setup information received from the terminal apparatus.

9. The information processing system according to claim 6, wherein an acquisition destination specified by the acquisition destination information is a service providing system which provides
a user interface for receiving a registration of the setup information from a user, and a storage area for storing the setup information received from the user interface.

\* \* \* \* \*